United States Patent
Ishikawa et al.

(10) Patent No.: US 6,511,146 B2
(45) Date of Patent: Jan. 28, 2003

(54) COMPLEMENTARY RECORDING SYSTEM USING MULTI-SCAN

(75) Inventors: Yoshikazu Ishikawa, Yokohama (JP); Hiroyuki Miyake, Kawasaki (JP); Makoto Katsuma, Kawaguchi (JP); Hiroshi Endo, Sagamihara (JP); Takeshi Ozasa, Yokohama (JP); Junkichi Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/083,517

(22) Filed: Feb. 27, 2002

(65) Prior Publication Data

US 2002/0122087 A1 Sep. 5, 2002

Related U.S. Application Data

(62) Division of application No. 09/323,033, filed on Jun. 1, 1999.

(30) Foreign Application Priority Data

May 20, 1998 (JP) ............................................ 10-149497
Jul. 30, 1998 (JP) ............................................ 10-215686
May 14, 1999 (JP) ............................................ 11-134057

(51) Int. Cl.[7] ............................................... B41J 2/205
(52) U.S. Cl. ........................................................ 347/15
(58) Field of Search ................................. 347/15, 41, 43

(56) References Cited

U.S. PATENT DOCUMENTS

| | | | |
|---|---|---|---|
| 4,313,124 A | 1/1982 | Hara ............................ | 347/57 |
| 4,345,262 A | 8/1982 | Shirato et al. ................ | 347/10 |
| 4,459,600 A | 7/1984 | Sato et al. .................... | 347/47 |
| 4,463,359 A | 7/1984 | Ayata et al. .................. | 347/56 |
| 4,558,333 A | 12/1985 | Sugitani et al. ............... | 347/65 |
| 4,723,129 A | 2/1988 | Endo et al. ................... | 347/56 |
| 4,740,796 A | 4/1988 | Endo et al. ................... | 347/56 |
| 5,561,449 A | 10/1996 | Raskin et al. ................. | 347/37 |
| 5,563,985 A | 10/1996 | Klassen et al. ............... | 395/109 |
| 6,082,849 A * | 7/2000 | Chang et al. ................. | 347/43 |
| 6,089,695 A | 7/2000 | Takagi et al. ................. | 347/40 |
| 6,267,218 B1 | 7/2001 | Hochmuth et al. .......... | 192/223.2 |
| 6,367,908 B1 * | 4/2002 | Serra et al. .................... | 347/37 |

FOREIGN PATENT DOCUMENTS

| | | | |
|---|---|---|---|
| EP | 0610096 | 8/1994 | ............ B41J/2/205 |
| EP | 0640479 | 3/1995 | ............ B41J/2/01 |
| EP | 0745484 | 12/1996 | ............ B41J/2/21 |
| EP | 0796740 | 9/1997 | ............ B41J/11/00 |
| JP | 54-56847 | 5/1979 | ............ B41M/5/26 |
| JP | 59-123670 | 7/1984 | ............ D41J/3/04 |
| JP | 59-138461 | 8/1984 | ............ B41J/3/04 |
| JP | 60-71260 | 4/1985 | ............ B41J/3/04 |
| JP | 62-53492 | 3/1987 | ............ B41F/17/00 |
| JP | 3-46589 | 2/1991 | |

* cited by examiner

Primary Examiner—John Barlow
Assistant Examiner—Alfred E Dudding
(74) Attorney, Agent, or Firm—Fitzpatrick, Cella, Harper & Scinto

(57) ABSTRACT

An image forming apparatus wherein an image for a predetermined region of a recording material is formed using images having a complementary relation by a plurality of scans of a recording head, the apparatus including allocating means for allocating a multi-level image data for the predetermined region for the scans; gradation reducing means for reducing gradation of the multi-level image data allocated by the allocating means, respectively; image forming means for forming an image having the complementary relation by driving the recording head in the scans on the basis of the image data having gradations reduced by the reducing means; wherein the complementary relation of the image by the forming means is reduced by at least one of the allocating means and the gradation reducing means.

23 Claims, 37 Drawing Sheets

|  | * | 9/32 | 3/32 |
|---|---|---|---|
| 5/32 | 9/32 | 3/32 |  |
|  | 3/32 |  |  |

FIG. 6A

|  |  | * | 2/8 | 1/8 |
|---|---|---|---|---|
| 1/8 | 1/8 | 2/8 | 1/8 |  |

MULTI-LEVEL
| 100 | 250 | 80 | 140 | 60 |
|---|---|---|---|---|
| 78 | 180 | 90 | 16 | 40 |
| 144 | 70 | 160 | 120 | 50 |

BINIRIZATION

FIG. 7B

ERROR DIFFUSION MATRIX A

FIG. 7C

BINARY
| 0 | 1 | 1 | 0 | 1 |
|---|---|---|---|---|
| 0 | 1 | 0 | 0 | 1 |
| 1 | 0 | 1 | 0 | 0 |

ALLOCATION

FIG. 7D

BINARY
| 0 | F | R | 0 | F |
|---|---|---|---|---|
| 0 | R | 0 | 0 | F |
| F | 0 | R | 0 | 0 |

BINARY
| 0 | 1 | 0 | 0 | 1 |
|---|---|---|---|---|
| 0 | 0 | 0 | 0 | 1 |
| 1 | 0 | 0 | 0 | 0 |

BINARY
| 0 | 0 | 1 | 0 | 0 |
|---|---|---|---|---|
| 0 | 1 | 0 | 0 | 0 |
| 0 | 0 | 1 | 0 | 0 |

PRIOR ART

FIG. 11A
MULTI-LEVEL

| 100 | 250 | 80 | 140 | 60 |
|---|---|---|---|---|
| 78 | 180 | 90 | 16 | 40 |
| 144 | 70 | 160 | 120 | 50 |

ALLOCATION

FIG. 11B
F HD  MULTI-LEVEL

| 100 | 250 | 80 | 140 | 60 |
|---|---|---|---|---|
| 78 | 180 | 90 | 16 | 40 |
| 144 | 70 | 160 | 120 | 50 |

× 0.55 DATA CONVERSION

FIG. 11C
R HD  MULTI-LEVEL

| 100 | 250 | 80 | 140 | 60 |
|---|---|---|---|---|
| 78 | 180 | 90 | 16 | 40 |
| 144 | 70 | 160 | 120 | 50 |

× 0.45 DATA CONVERSION

FIG. 11D
MULTI-LEVEL

| 55 | 137 | 44 | 77 | 33 |
|---|---|---|---|---|
| 43 | 99 | 49 | 9 | 22 |
| 79 | 39 | 88 | 66 | 28 |

FIG. 11E
MULTI-LEVEL

| 45 | 113 | 36 | 63 | 27 |
|---|---|---|---|---|
| 35 | 81 | 41 | 7 | 18 |
| 65 | 31 | 72 | 54 | 22 |

FIG. 11F
BINARY
ERROR DIFFUSION MATRIX A

FIG. 11G
BINARY
ERROR DIFFUSION MATRIX A

FIG. 11H
F HD  BINAR

| 0 | 1 | 0 | 1 | 0 |
|---|---|---|---|---|
| 0 | 0 | 0 | 0 | 0 |
| 1 | 0 | 0 | 1 | 0 |

FIG. 11I
R HD  BINAR

| 0 | 0 | 1 | 0 | 0 |
|---|---|---|---|---|
| 0 | 0 | 0 | 0 | 0 |
| 0 | 0 | 1 | 0 | 0 |

FIG. 14A

MULTI-LEVEL
| 100 | 250 | 80 | 140 | 60 |
|---|---|---|---|---|
| 78 | 180 | 90 | 16 | 40 |
| 144 | 70 | 160 | 120 | 50 |

ALLOCATION ↙  ↘ ALLOCATION

MULTI-LEVEL
| 100 | 250 | 80 | 140 | 60 |
|---|---|---|---|---|
| 78 | 180 | 90 | 16 | 40 |
| 144 | 70 | 160 | 120 | 50 |

× 0.5 | DATA CONVERSION

MULTI-LEVEL
| 100 | 250 | 80 | 140 | 60 |
|---|---|---|---|---|
| 78 | 180 | 90 | 16 | 40 |
| 144 | 70 | 160 | 120 | 50 |

× 0.5 | DATA CONVERSION

FIG. 14D

MULTI-LEVEL
| 55 | 125 | 40 | 70 | 30 |
|---|---|---|---|---|
| 39 | 90 | 45 | 8 | 20 |
| 72 | 35 | 80 | 60 | 25 |

FIG. 14E

MULTI-LEVEL
| 50 | 125 | 40 | 70 | 30 |
|---|---|---|---|---|
| 39 | 90 | 45 | 8 | 20 |
| 72 | 35 | 80 | 60 | 25 |

BINARY

FIG. 14F ERROR DIFFUSION MATRIX A

BINARY

FIG. 14G ERROR DIFFUSION MATRIX B

FIG. 14H

BINAR
| 0 | 1 | 0 | 0 | 1 |
|---|---|---|---|---|
| 0 | 1 | 0 | 0 | 0 |
| 1 | 0 | 0 | 0 | 1 |

FIG. 14I

BINAR
| 0 | 1 | 0 | 1 | 0 |
|---|---|---|---|---|
| 0 | 0 | 1 | 0 | 0 |
| 1 | 0 | 1 | 0 | 0 |

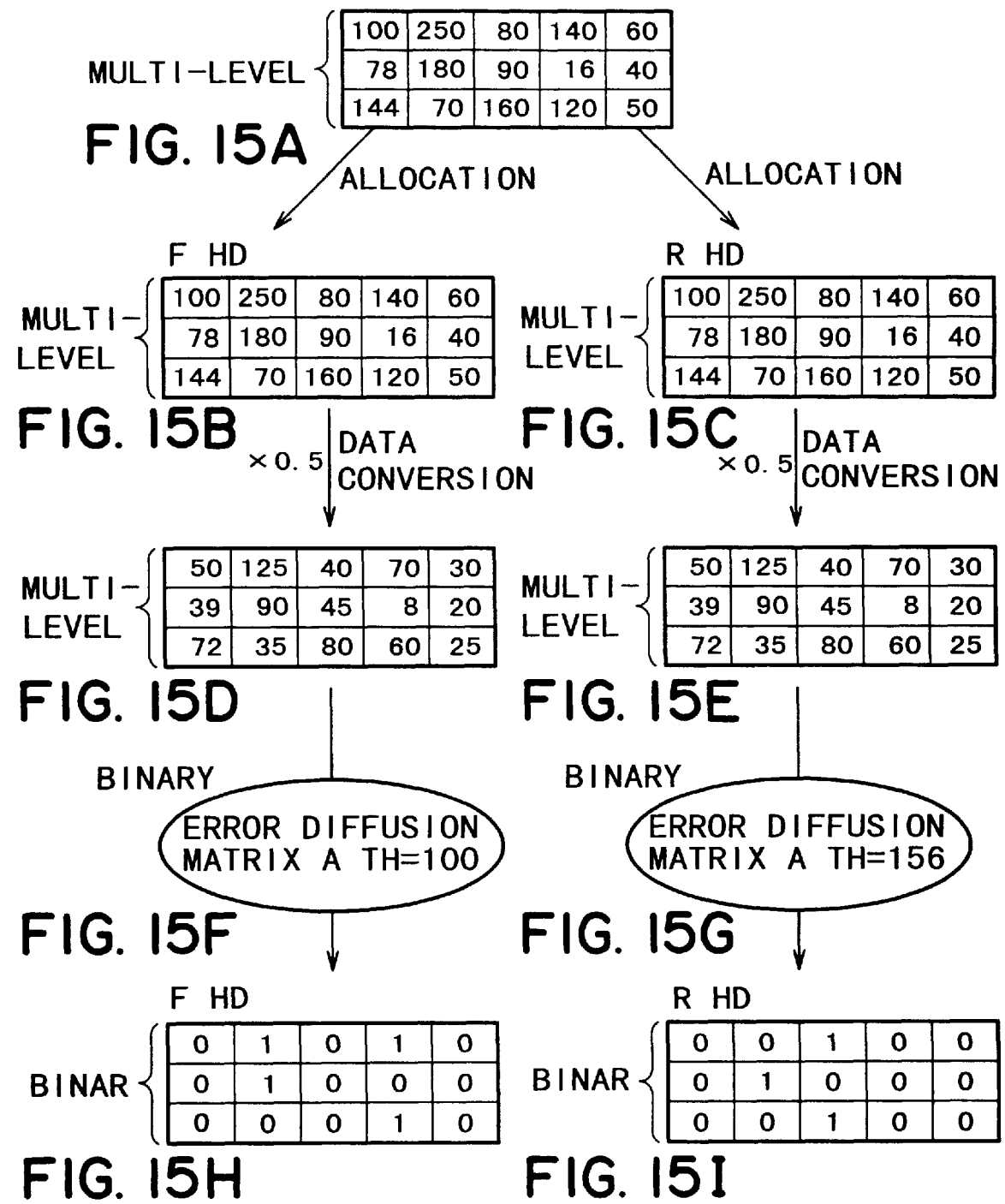

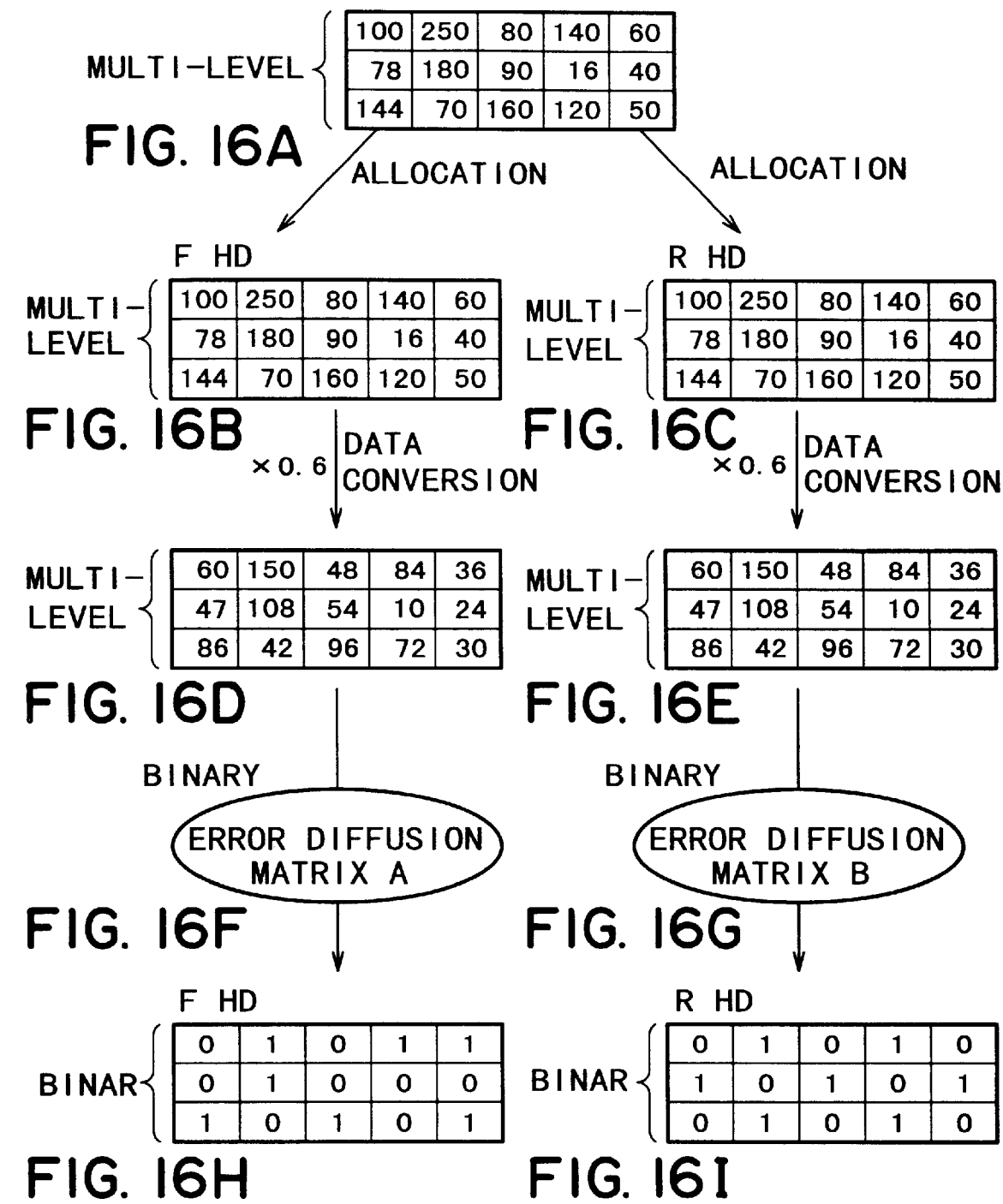

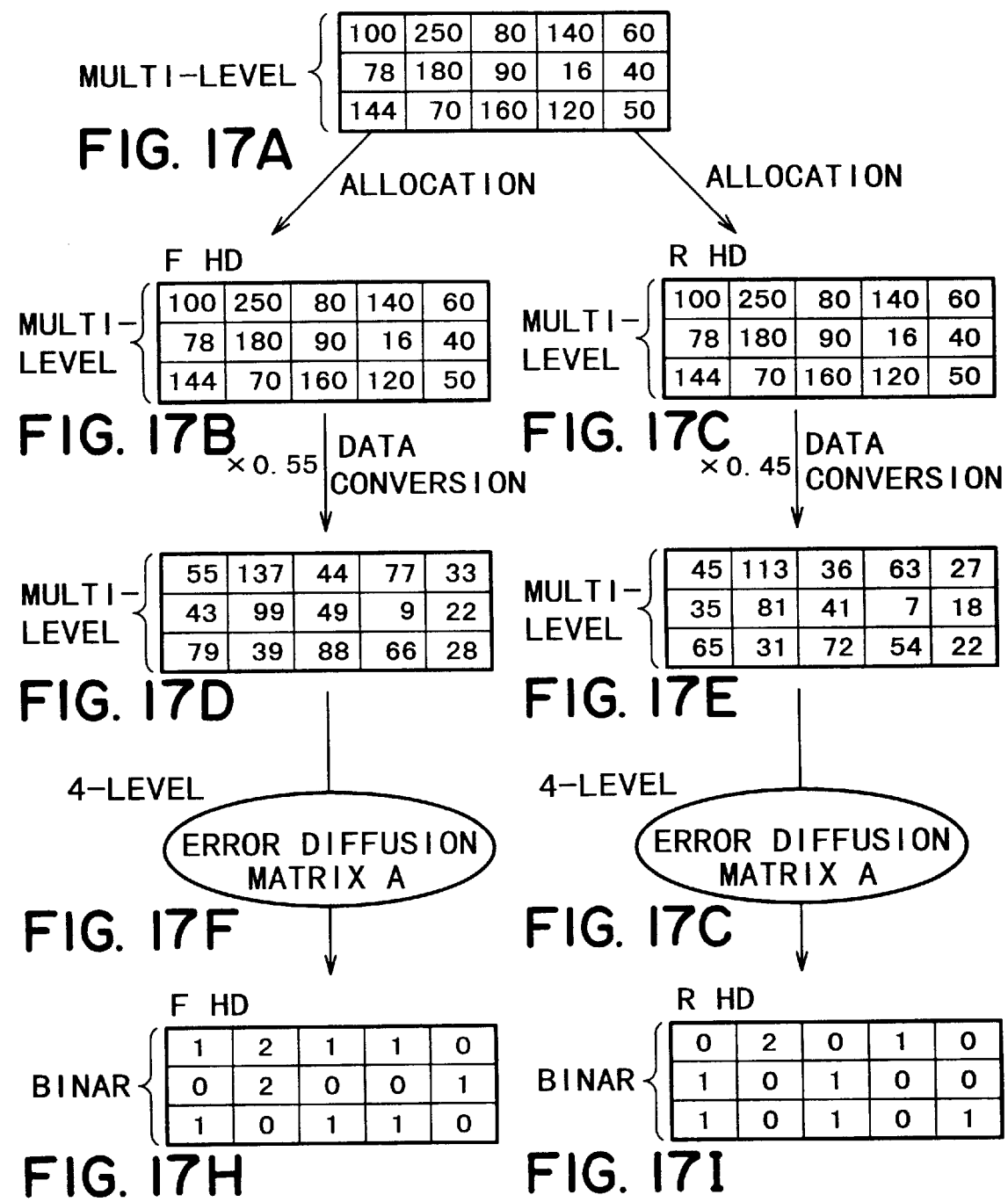

FIG. 19A
MULTI-LEVEL

| 100 | 250 | 80 | 140 | 60 |
|-----|-----|----|-----|----|
| 78 | 180 | 90 | 16 | 40 |
| 144 | 70 | 160 | 120 | 50 |

ALLOCATION → 1ST SCAN / 2ST SCAN

FIG. 19B  MULTI-LEVEL

| 100 | 250 | 80 | 140 | 60 |
|-----|-----|----|-----|----|
| 78 | 180 | 90 | 16 | 40 |
| 144 | 70 | 160 | 120 | 50 |

×0.55 DATA CONVERSION

FIG. 19C  MULTI-LEVEL

| 100 | 250 | 80 | 140 | 60 |
|-----|-----|----|-----|----|
| 78 | 180 | 90 | 16 | 40 |
| 144 | 70 | 160 | 120 | 50 |

×0.45 DATA CONVERSION

FIG. 19D  MULTI-LEVEL

| 55 | 137 | 44 | 77 | 33 |
|----|-----|----|----|----|
| 43 | 99 | 49 | 9 | 22 |
| 79 | 39 | 88 | 66 | 28 |

FIG. 19E  MULTI-LEVEL

| 45 | 113 | 36 | 63 | 27 |
|----|-----|----|----|----|
| 35 | 81 | 41 | 7 | 18 |
| 65 | 31 | 72 | 54 | 22 |

FIG. 19F  BINARY ERROR DIFFUSION MATRIX A

FIG. 19G  BINARY ERROR DIFFUSION MATRIX A

FIG. 19H  1ST SCAN  BINAR

| 0 | 1 | 0 | 1 | 0 |
|---|---|---|---|---|
| 0 | 0 | 0 | 0 | 0 |
| 1 | 0 | 0 | 1 | 0 |

FIG. 19I  2ST SCAN  BINAR

| 0 | 0 | 1 | 0 | 0 |
|---|---|---|---|---|
| 0 | 0 | 0 | 0 | 0 |
| 0 | 0 | 1 | 0 | 0 |

| FLAG | F | R | B | N | DENSITY (%) |
|---|---|---|---|---|---|
| EN1 | H | L | H | L | — |
| EN2 | L | H | H | L | — |
| PROBABILITY. (%) | APRROX. 45 | APRROX. 45 | APRROX. 10 | 0 | 110 |

AND-OR MATRIXES 901 (CONDITIGN 81)

| FLAG | F | R | B | N | DENSITY (%) |
|---|---|---|---|---|---|
| EN1 | H | L | H | L | — |
| EN2 | L | H | H | L | — |
| PROBABILITY. (%) | APRROX. 55 | APRROX. 45 | 0 | 0 | 100 |

AND-OR MATRIXES 902 (CONDITIGN 82)

| FLAG | F | R | B | N | DENSITY (%) |
|---|---|---|---|---|---|
| EN1 | H | L | H | L | — |
| EN2 | L | H | H | L | — |
| PROBABILITY. (%) | APRROX. 45 | APRROX. 45 | 0 | APRROX. 10 | 90 |

AND-OR MATRIXES 903 (CONDITIGN 83)

| FLAG | F | R | B | N | DENSITY (%) |
|---|---|---|---|---|---|
| EN1 | H | L | H | L | — |
| EN2 | L | H | H | L | — |
| PROBABILITY. (%) | APRROX. 45 | APRROX. 55 | 0 | 0 | 100 |

AND-OR MATRIXES 904 (CONDITIGN 84)

FIG. 29

COMPLEMENTARY RECORDING SYSTEM USING MULTI-SCAN

CROSS REFERENCE TO RELATED APPLICATION

This application is a division of Application No. 09/323,033, filed Jun. 1, 1999.

FIELD OF THE INVENTION AND RELATED ART

The present invention relates to an image forming apparatus, an image forming method and an image processing method for effecting recording on a recording material wherein a density non-uniformity attributable to variation of a recording property among a plurality of recording elements of a recording head. More particularly, it relates to an image forming apparatus, an image forming method and an image processing method wherein moire or the like attributable to error in a mounting position of the recording heads.

An ink jet recording apparatus is known in which a recording head provided with a plurality of ink ejection outlets, as an example of an apparatus using a recording head provided with a plurality of recording elements.

In such an apparatus, sizes and/or positions of the dots provided by the ink are not uniform due to variations in ejection outlet diameters of the ejection outlets and/or ejecting directions, and if this occurs, the printed image density. Particularly, in a recording device of a serial type in which the recording head is scanningly moved in a direction different from the direction of arrangement of the recording elements, for example, perpendicular thereto, the density non-uniformity attributable to the above-described variation in the ejection outlet diameters results in stripes in the printed image, with the result that quality of the image is deteriorated.

In order to correct such a density non-uniformity, it has been proposed that in the image formation using a recording head of an ink jet recording type, one pixel or pixels of a line corresponding to one scanning of a recording head, is printed by ink ejected from different ejection outlets on the basis of image data which have been processed for low gradation. This can be done by feeding the sheet through a distance smaller than the width of the recording head and completing one pixel by a plurality of scans for paths. Plurality of FIG. 3 shows an arrangement of a conventional ink jet recording head The printer usable with this recording head forms an image by CMYK ink s (four colors). The recording head 601 is provided with two ink jet heads of each ink color, and a head 603 (rear head) disposed at an upper position in the Figure and a lower head 602 (front head) are disposed in a sub-scan direction with a distance of 2.5 bands (one band is a unit of a width measured in a direction of the nozzle array operated in one scan of the ink jet head).

FIG. 4 shows an overlaying state of printing using the head 602 and the rear head 603 in the printer using the recording head show in FIG. 3. One sub-scan is carried out for one main-scanning. A distance of feeding in the sub-scan direction is one band, so that image is formed with deviation of half-band between the front head 602 and the rear head 603. Here, the half-band 703 is constituted by the uproar one half of the front head 602 and the lower one half of the rear head 603, and the half-band 704 is constituted by the lower one half of the front head 602 and the upper one half of the rear head 603.

Referring to FIG. 5, the description will be made as to the process in which the image data of a multi-level type fed to the printer are binarized, and are converted to head driving data to eject the ink from the nozzle.

(1) The image data of the multi-level type transferred from a host computer is stored in an image data storing apparatus 801. The data are fed out from here one by one band.

(2) A pallet conversion circuit 802 separates the image data to multi-level data of respective ink colors. The description will be made as to black ink Bk as a representative.

(3) A "gamma" conversion circuit 803-K effects a "gamma" conversion to the multi-level data separated for each ink color.

(4) A non-uniformity correcting circuit 804-K corrects the non-uniformity due to the variation in the properties of the nozzles, using a non-uniformity correction table (look-up table for conversion from multi-level data to multi-level data).

(5) A binarizing circuit 805-K coverts the multi-level to binary data using an error diffusion method (ED).

(6) A SMS (sequential multi- scanning) circuit 806-K determines which one of the front head 602-K and the rear head 603-K is to be used. The SMS circuit, when a certain raster scan is considered, allots the data to the front, rear, front, rear, namely, alternatingly from the left end dot, and they are outputted to the TMC (Timing Memory Controller) circuits 807-K1, 807-K2. By doing so, it does not occur that adjacent dots are printed by the same head, and the printing operation can be carried out at double speed the driving frequency of the head. The dot appearing first in each raster scan is printed by the rear head 603-K in the case of an odd number raster scan and by the front head 602-K in the case of an even number raster scan.

(7) In the TMC circuits 807-K1, 807-K2, the data for one band are outputted to each head 602-K, 603-K. A positional deviation in the main-scanning direction between the heads 807-K1, 807-K2 is adjusted using lateral registration adjusting value, the output timing for one array is different depending on the lateral registration adjusting value.

(8) PHC (Printer/head connector) substrates 808-K1, 808-K2 output the binary data in the nozzle array direction, corresponding to the nozzles which actually effect printing. A positional deviation in the nozzle array direction between heads 807-K1, 807-K2 is adjusted by longitudinal registration adjusting value. The recording head in this example has 1344 nozzles and additional upper and lower 8 nozzles which are effective for printing, and therefore, the longitudinal registration adjusting value is in the range of −8−+8. When the longitudinal registration adjusting value is ±0, central 1344 nozzles are used, but when the longitudinal registration adjusting value is ±1−8, the actually used nozzles are deviated by 1−8 nozzles from the center. The data for 1344 nozzles are outputted corresponding to the nozzles to be actuated, using the longitudinal registration adjusting value.

(9) Finally, the binary data for each nozzle are converted to head driving data by a print control device (Head CPU) 809 to eject the ink for printing.

Referring to FIG. 7, there is shown the processes (5), (6) in more detail. The multi-level data after the color separation, the "gamma" conversion and the non-uniformity correcting process (802, 803, 804 in FIG. 5) are subjected to error diffusion process (FIG. 7B) using an error diffusion matrix A (FIG. 6A) to effect binarization (FIG. 7C). In FIG.

6, asterisk indicates the noting pixel. By SMS (806 in FIG. 5), the determination will be made as to whether the front head or the rear head is to be used. The data shown in FIG. 7E is fed to the front head, and the data shown in FIG. 7F are fed to the rear head.

According to the above-described method, an image in the predetermined region is formed by different nozzles of two heads, and therefore, the density non-uniformity or the like due to variation in the properties of nozzles can be reduced. In addition, the pitch of the interfaces is half-band so that bandings is less conspicuous.

In this manner, the density non-uniformity attributable to the properties peculiar to the ejection outlets of the ink jet head, can be diffused on the recording material, by which the density non-uniformity is reduced. This is called "multi-scan" or "multi-path". Furthermore, a so-called sequential multi-scan (SMS) system has been proposed in which the ink ejection outlets are actuated in a predetermined order mainly to make use frequency of the ink ejection outlets uniform.

However, it has been found that there is a point to improve in use with large scale multi-color ink jet printing apparatus, for example, a textile printing apparatus in which the scanning range is as large as several meters, and in addition to the yellow color, magenta color, cyan color and black color inks, light color and special color inks are used. More particularly, if ideal apparatus is used with the method, the recorded pixels are uniformly arranged. However, in actual deceived, the size and/or deposit positions of the dots provided by the ink varies due to the variation of the ejection outlet diameters of the ink and the variation of the direction of ejection, and in addition, due to unavoidable error in the mechanical mounting accuracy among recording heads, the variation in registration occurs between main-scanning. Therefore, the intervals between recorded unit pixels to be overlaid by the multi-scan are different with the result of moire and/or non-uniformity with half-scan interval. Particularly, in the case of reciprocal main-scanning recording, the mounting angle of the recording head or the shape of the ejection outlet is different between the forward path and the backward passage with the result of reciprocation non-uniformity.

The inventor's investigations have revealed that plurality of scans are in complete complementary relation, and this is a cause of the problem. In the above-described method, the half-band images are complementary with each other, that is, the dots provided by the scans are spatially complementary with each other. Therefore, if an error in registration occurs between the bands, for example, when the lateral registration is deviated by half dot, the complementation is effected with the lateral registration remaining If the recording is effected using an ideal apparatus and the method, the solid image has uniformly distributed dots without overlapping. In FIG. 8, designated by 21 (black dot) are the dots provided by a first scanning, and designated by 22 (white dot) are the dots provided by the second scanning.

However, in the actual machines, the unavoidable error in the physical accuracy results in small change or non-uniformity in the respective scans, and therefore, when the dots provided by prospective scans are overlaid, the dots are too close or too remote relative to each other. For example, when A lateral registration of half dot occurs in the first scanning, sparse/dense states or overlapping of dots appears, as shown in FIG. 9. FIG. 9. Designated by 21 (black dots) are the dots printed by the first scanning, and designated by 22 (white dots) are the dots provided by the second scanning. As a result, the printed image is different from the intended image in the image density, that is, the image density not uniform. More particularly, there appear dark bands and light bands ("band" is a unit width in the direction of nozzle array covered by one scan of the ink jet head).

SUMMARY OF THE INVENTION

Accordingly, it is a principal object of the present invention to provide an image forming apparatus, an image forming method and an image processing method wherein the multi-scan type is used, and a high quality image can be provided at high speed with reduced density difference due to difference between unit pixels recorded.

It is another object of the present invention to provide an image forming apparatus, an image forming method and are image processing method wherein the image density does not significantly changes even when the registration slightly changes due to physical error, so that uniform images can be provided with reduced density non-uniformity.

According to an aspect of the present invention, there is provided an image forming apparatus wherein an image for a predetermined region of a recording material is formed using images having a complementary relation by a plurality of scans of a recording head, said apparatus comprising allocating means for allocating a multi-level image data for the predetermined region for the scans; gradation reducing means for reducing gradation of the multi-level image data allocated by said allocating means, respectively; image forming means for forming an image having the complementary relation by driving said recording head in said scans on the basis of the image data having gradations reduced by said reducing means; wherein the complementary relation of the image by said forming means is reduced by at least one of said allocating means and said gradation reducing means.

With this structure, the images provided by the respective scannings have less complementary relation or reduced complementary relation so that even if the registration changes due to physical accuracy error, the image density does not change significantly since the dependency upon the registration is less, and therefore, the uniformity can be maintained.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 6A, B show examples of error matrix.

FIGS. 7A–F illustrate a conventional image processing method.

FIGS. 11A–I shows specific examples of image processing in Embodiment 1.

FIGS. 14A–I illustrate specific examples of image processing according to Embodiment 2 of the present invention.

FIGS. 15A–I illustrate specific examples of image processing according to Embodiment 3 of the present invention.

FIGS. 16A–I illustrate specific examples of image processing according to Embodiment 4 of the present invention.

FIGS. 17A–I illustrate specific examples of image processing according to Embodiment 5 of the present invention.

FIGS. 19A–I shows specific examples of image processing according to Embodiment 6 of the present invention.

FIG. 29 illustrates an operation of an AND-OR matrix portion used in the eighth embodiment of the present invention.

DESCRIPTION OF THE PREFERRED EMBODIMENTS

Referring to the accompanying drawings, the embodiments of the present invention will be described. Embodiments 1–3 use a plurality of same color heads; Embodiment 4 uses 4-level processing in place of the binary gradation reduction, and Embodiment 5 uses one head for the same color.

Figure 1:
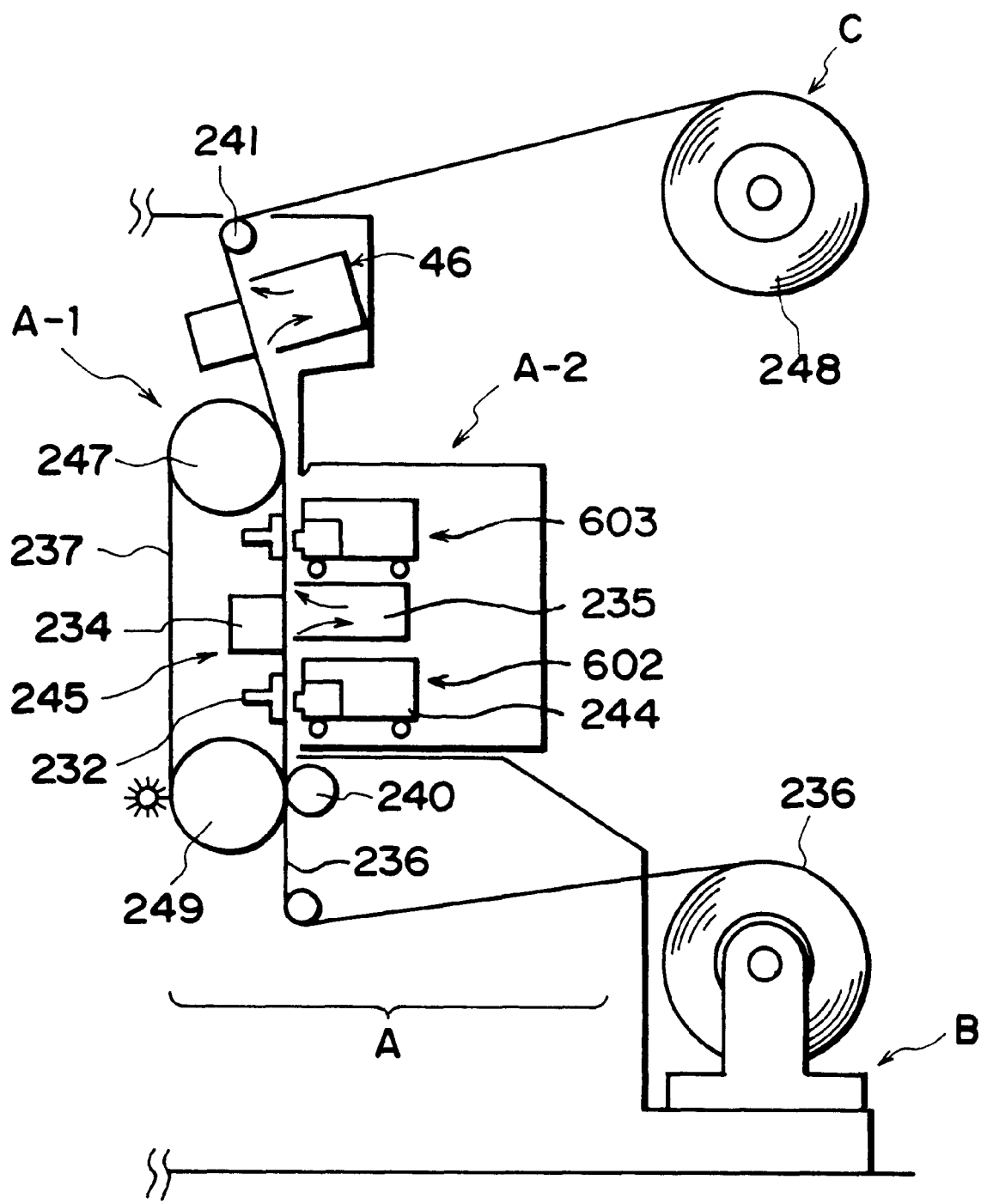
FIG. 1 is a schematic view illustrating an image print portion of a textile printing machine of an ink jet recording type for printing on textile, to which the present invention is applicable.

FIG. 1 is a schematic view of and image printing portion of a textile printing machine of an ink jet recording type for effecting printing on a textile, to which the present invention is applicable. The printing apparatus comprises a textile feeding portion B for feeding a print medium such a rolled textile having been subjected to a pre-process for textile printing, a main assembly portion A for printing by ink jet heads while the fed print medium advanced precisely, and a winding-up portion C for drying and winding the printed material up. The main assembly portion A comprising a precise feeding portion A-1 for the print medium, the portion A-1 including a platen, and an ink jet print.

The operation of the operators will be described with an example in which the textile printing is carried out on a pre-processed medium.

The pre-processed roller-like print medium 236 is fed out from the feeding portion B to the main assembly portion. The main assembly portion is provided with an endless belt 237 which is precisely and stepwisely driven and which is extended and stretched around a driving roller 247 and a winding roller 249. The driving roller 247 is driven stepwisely directly by a stepping motor (unshown) with high resolution to feed the belt by the step distance. The fed textile 236 urged to a surface of the belt 237 backed up by the winding roller 249, by a press-contact roller 240.

The print medium 236 stepwisely fed by the belt is correctly positioned by a platen 232 contacted to the back side of the belt at a first print portion 602. Each time the printing operation for one line is completed, the stepping is carried out, and the medium is dried by a heating plate 234 from the back side of the belt and by the warm air supplied to the front side through a warm air duct 235. Subsequently, the overlaying print is carried out at a second print portion 603 in the similar manner as in the first print portion.

After the printing, the print medium 236 is peeled, and is dried again at a posit-drying portion 246 similarly to the heating plate 234 and the warm air duct 235, and is guided by a guiding roller 241 and is wound up on a winding roller 248. The print medium 236 is then dismounted from the present apparatus, and is subjected to post-processing steps including coloring, cleaning and dry steps or the like.

The description will be made as to the ink jet print portion A-2, referring to FIG. 2.

Here, the information is printed with thinned dots by the heads of the first print portion, and the medium is subjected to the drying process, and then, is subjected to printing by the heads of the second print portion so as to complement the thinned part by the first print portion.

Figure 2:
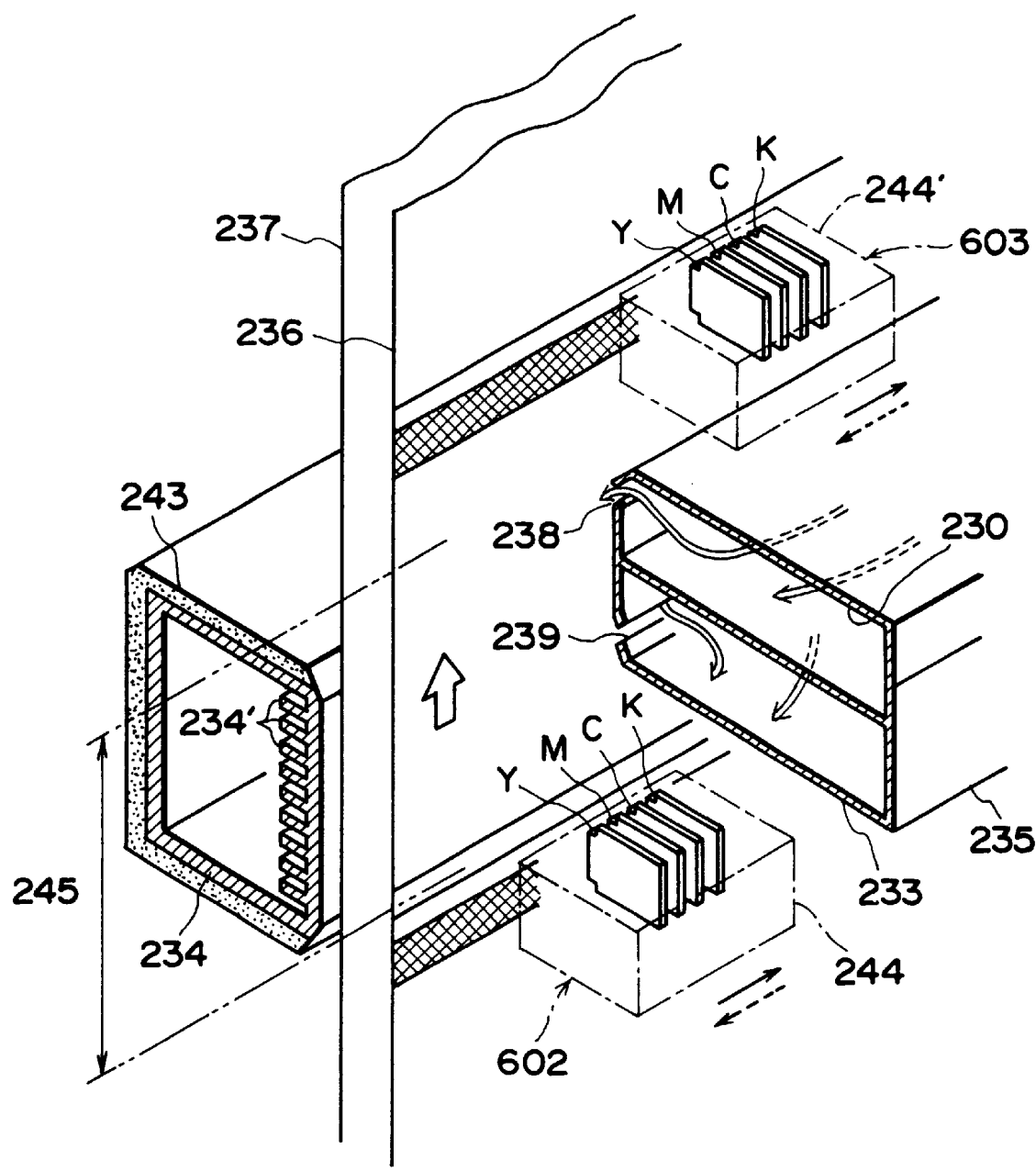
FIG. 2 is a perspective view illustrating in detail a neighborhood of the jet print portion A-2 of FIG. 1.
Figure 3:
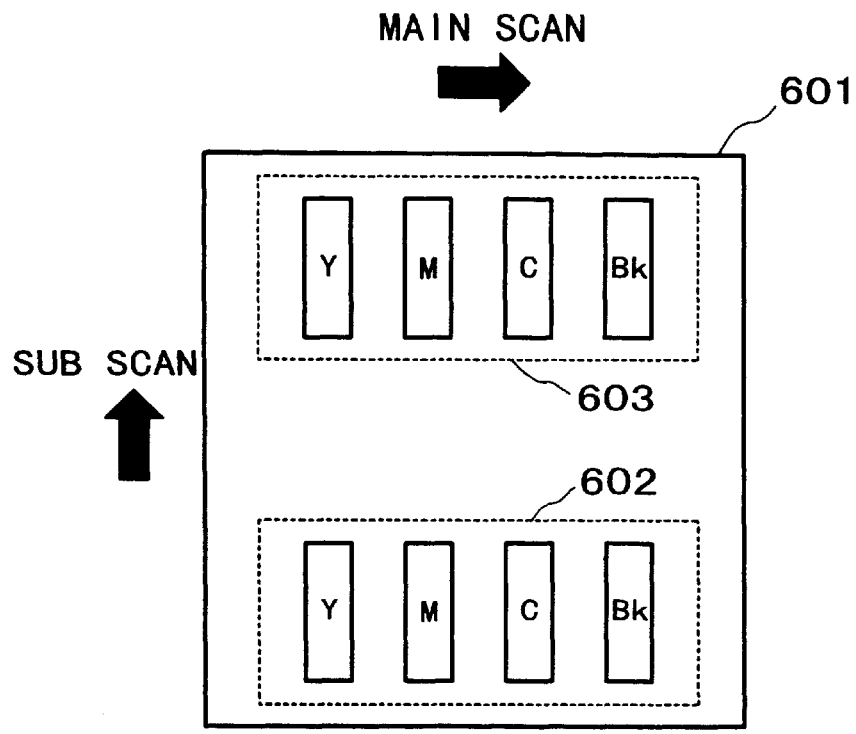
FIG. 3 illustrates arrangement of heads usable with the present invention.
Figure 4:
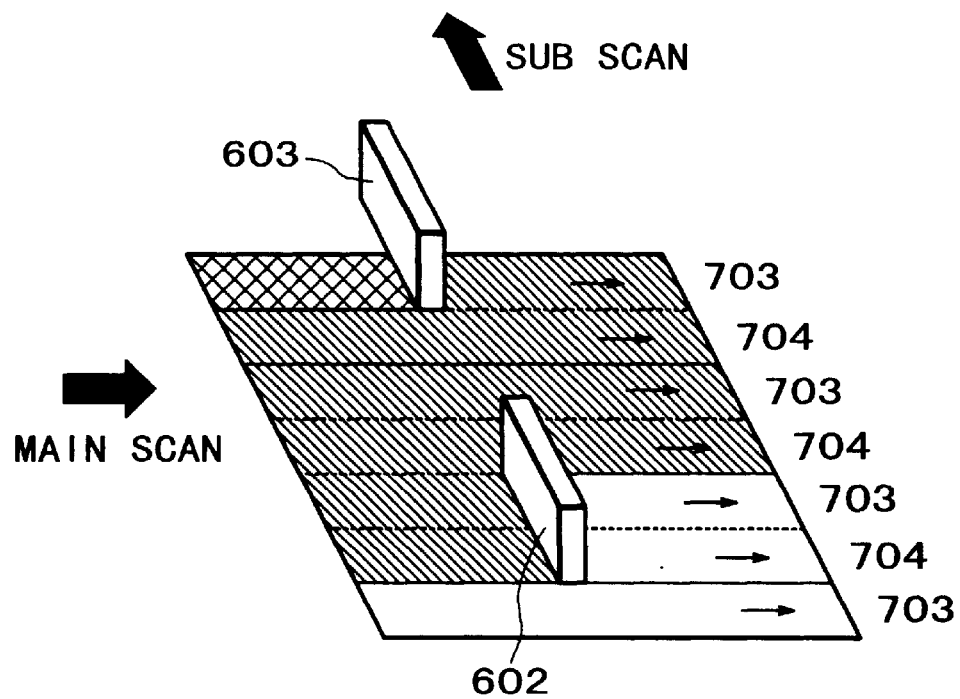
FIG. 4 illustrates overlaying state of the printed images provided by the front head and the rear head.
Figure 5:
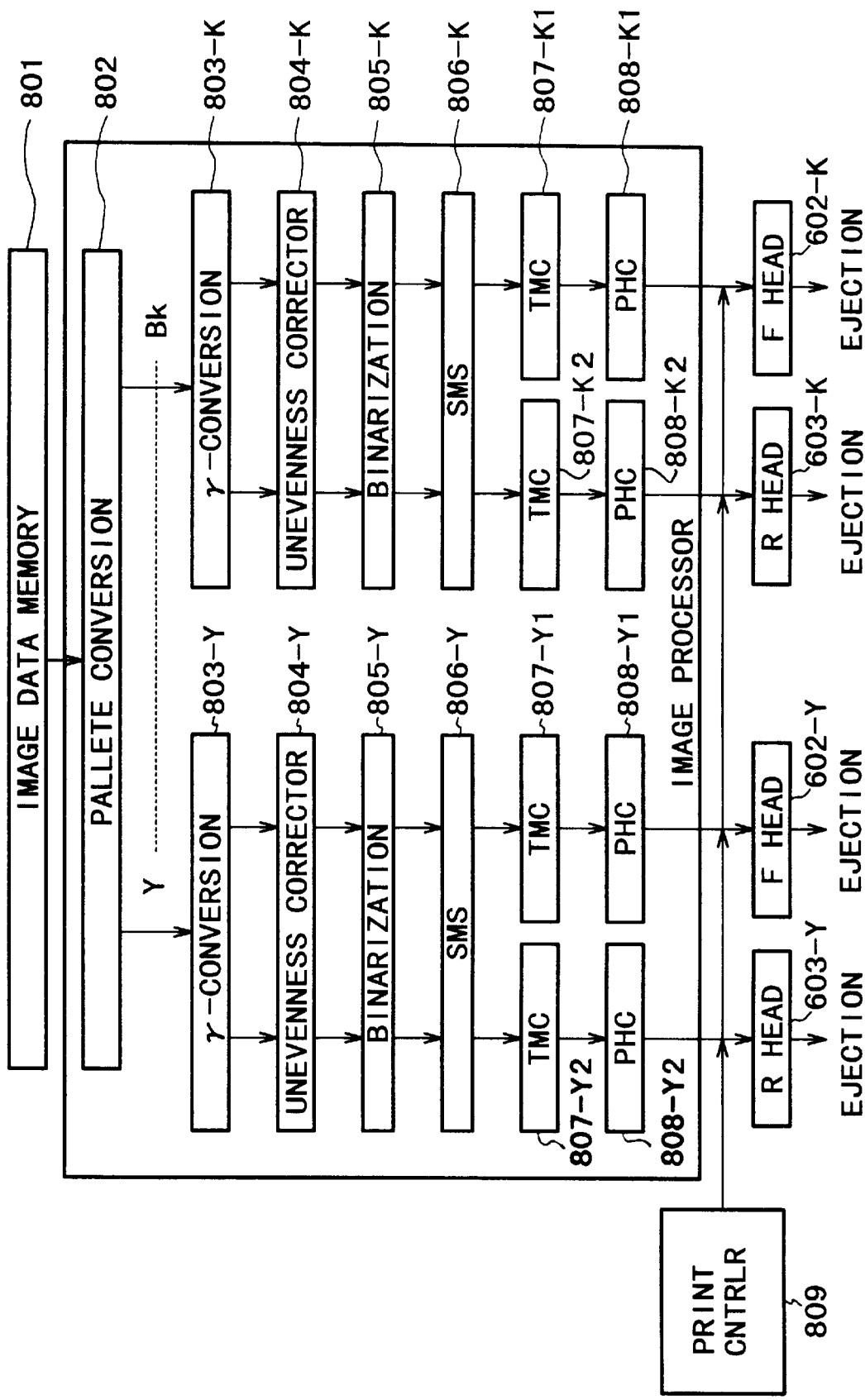
FIG. 5 is a block diagram showing processes in which the data supplied to a conventional printer are printed.
Figure 8:
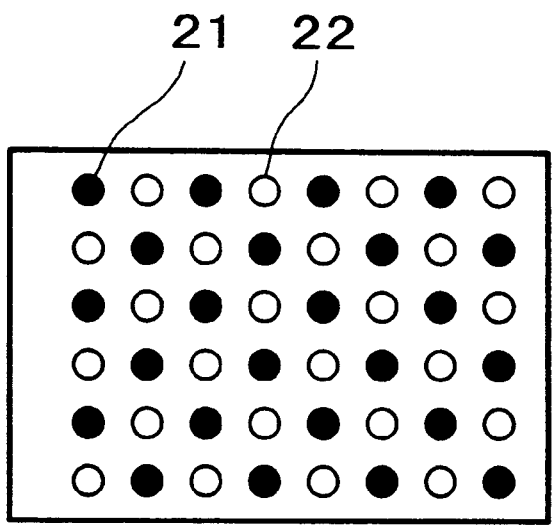
FIG. 8 illustrates positions of dots when the overlaying printing is effected by the ideal conventional front head and rear head.

In FIG. 2, the print medium is stuck on the belt 237 to be stepped upwardly in the Figure. In the Figure, the first print portion 602 disposed at a lower petition is provided with a first carriage 244 carried four ink jet heads for Y, M, C, K. In this example, the ink jet head (printing heads) uses thermal energy generating elements for creating film boiling in the ink to eject the ink.

Downstream of the first print portion, there is provided a drying station 245 including a heating plate 234 for heating the medium from the back side of the belt and a warm air duct 235 for dry it from the front side. A heat transfer surface of the heating plate 234 is pressed against an endless belt which is strongly tensioned, and belt 237 is strongly heated from the back side with high temperature and high pressure vapor through the inner part which is hollow. The belt 237 directly and therefore efficiently heat the print medium 236 by heat conduction. An inside of the heating plate surface is provided with fins 234 to effectively catch the heat. The side not contacted to the belt is covered by a heat insulating material 243 so as to reduce heat loss by radiation.

At the front side, the dried air is supplied from a downstream supply duct 230, by which the print medium 236 which is drying is given the air having low humidity. The air flows in a direction which is opposite from the feeding direction of the print medium 236, and the air which has absorbed the moisture does not condensate on the machine devices since a much larger amount of air than the amount of the air supplied thereto is sucked by a suction duct 233. A supply source of the warm air is disposed at a rear side, and the air is sucked at the front side so that pressure difference between the blowing outlet 238 and the suction opening 239 faced to the print medium 236 is uniform over the entire longitudinal area. The air discharge/suction portion is offset toward downstream from the center of the rear heating plate 234 so that air is applied to the motion sufficiently heated. By doing so, the great amount of the water in the print medium 236 having absorbed the ink and thinning liquid at the first print portion 602.

The second print portion 603 is disposed downstream thereof (upper side in the Figure), with the second carriage having the structure similar to the first carriage. Downstream thereof, there is provided a dry portion 46 having the structure similar to the warm air duct 235.

The description will be made as to a specific example of the ink jet textile print. As described in the foregoing, FIG. 1 shows the structure of the ink jet printing apparatus suitable for textile printing the After the ink jet textile printing using the ink jet printing apparatus shown in FIG. 1, the print medium is dried (including air drying). Then, there is provided a step in which the dye in the print medium fibers continues to defuse, and is fixed by reaction. By this step, sufficient coloring and durability by the fixing of the dye is provided. The diffusing and reaction fixing step may be any of known type, for example, steaming method. In this case, an alkali process may be performed before the textile printing process.

Thereafter, non-reaction dye and the substance used in the pre-process are removed in the post-processing step. Finally, defect correction, ironing and other finishing steps are performed to complete the print.

(Embodiment 1)

In this embodiment, the process is different from the conventional one in which the allocation of the binary data to the front head and the rear head is performed after the binarization. More particularly, in this embodiment, the multi-level data before the binarization are allocated to the front head and to the rear head, and the allocated multi-level data are modified with different coefficients, and then, the thus modified or converted data are subjected to the binarization. By doing so, the complementary relation of the printed images provided by the scans is reduced to suppress the half-band non-uniformity.

Figure 10:
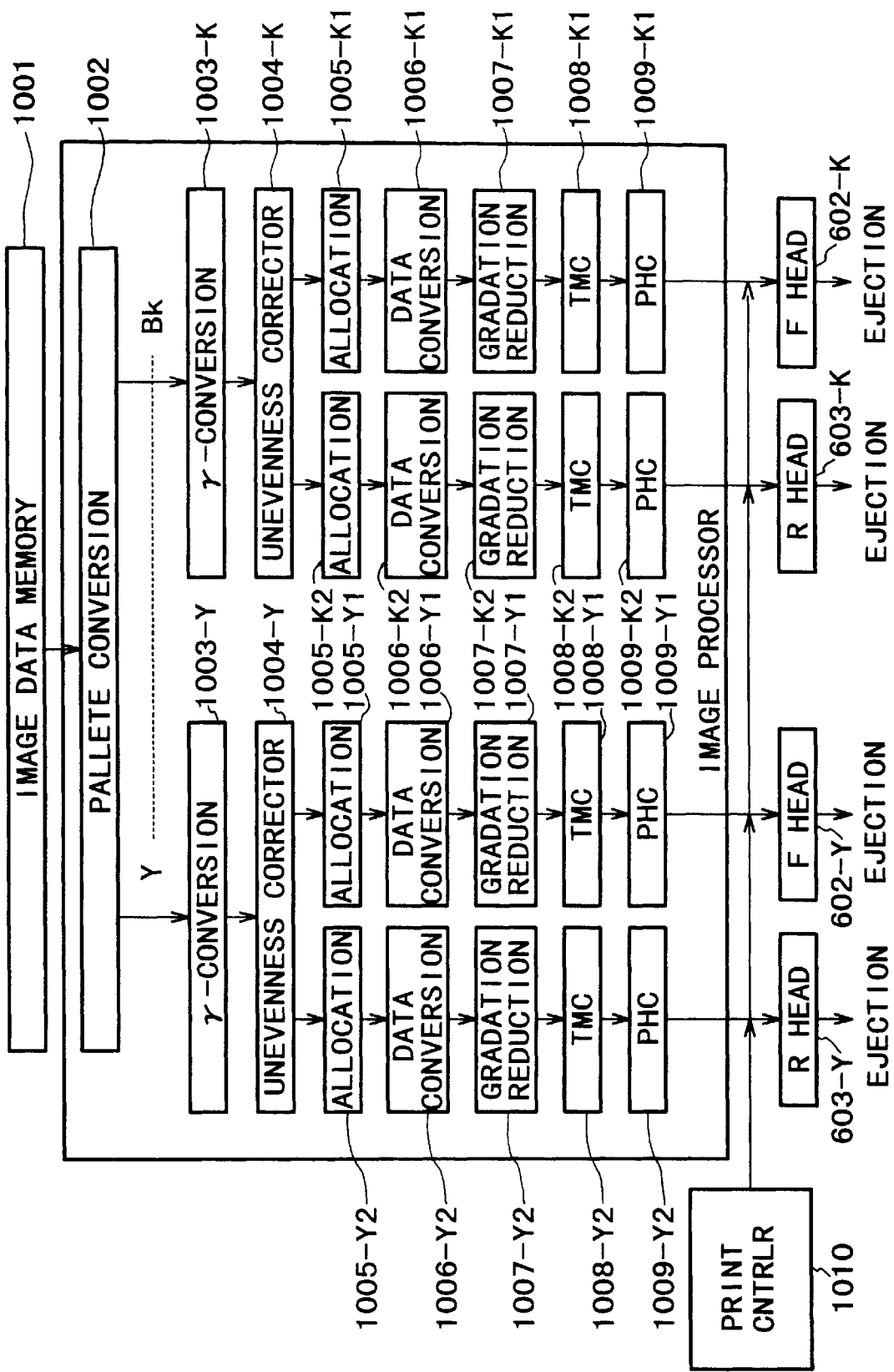
FIG. 10 is a block diagram showing a process in which the data supplied to a printer according to the present invention are printed.

Referring to FIG. 10, the description will be made as to the flow of process from binarization of the multi-level image data to the printing by ejection of the ink the conversion to head driving data.

(1) The image data of the multi-level type transferred from a host computer is stored in an image data storing apparatus 1001 The data are fed out from here one by one band.

(2) A pallet conversion circuit 1002 separates the image data to multi-level data of respective ink colors. The description will be made as to black ink Bk as a representative.

(3) A "gamma" conversion circuit 1003-K effects a "gamma" conversion to the multi-level data separated for each ink color.

(4) The non-uniformity correction circuit 1004-K correct the non-uniformity due to the variation in the nozzle properties using a non-uniformity correction table (look-up table for multi-level—to-multi-level conversion).

This process is the same as the conventional process.

(5) distribution circuits 1005-K1, 1005-K2 allocate the data either to the front head and to the rear head.

(6) data converting circuits 1006-K1, 1006-K2 effect data conversion with a predetermined coefficient for the allocated data, respectively.

(7) gradation reduction circuits 1007-K1, 1007-K2 effect gradation reduction process for each head using the error diffusion method.

(8) TMC (Timing Memory Controller) circuits 1008-K1, 1008-K2 output the data for one band for each head one by one nozzle array. A positional deviation in the main-scanning direction between the heads is adjusted using lateral registration adjusting value, the output timing for one array is different depending on the lateral registration adjusting value.

(9) PHC (Printer/head connector) substrates 1009-K1, 1009-K2 output the binary data in the nozzle array direction, corresponding to the nozzles which actually effect printing. A positional deviation in the nozzle array direction between heads is adjusted by longitudinal registration adjusting value. The recording head in this example has 1344 nozzles and additional upper and lower 8 nozzles which are effective for printing, and therefore, the longitudinal registration adjusting value is in the range of −8−+8. −8−+8. When the longitudinal registration adjusting value is ±0, central 1344 nozzles are used, but when the longitudinal registration adjusting value is ±1–8, the actually used nozzles are deviated by 1–8 nozzles from the center. The data for 1344 nozzles are outputted corresponding to the nozzles to be actuated, using the longitudinal registration adjusting value.

(10) Finally, the binary data for each nozzle are converted to head driving data by a print control device (Head CPU) 1010 to eject the ink for printing.

In this embodiment, the above-described process has been performed using hardware, but software is usable when it is appropriate.

FIG. 11 shows specific examples of the steps 1005, 1006, 1007 in FIG. 10. In FIG. 11, the multi-level data (FIG. 11) are divided into the image data to be fed to the front head 602 (B) and the data to be fed to the rear head 603 (C). The divided data are multiplied by different coefficient. For example, when the data of the noting pixel is 100, data 100 is allocated to the front head, and data 100 is allocated to the rear head. Then, the front head data are multiplied by 0.55 (D), and the rear head data are multiplied by 0.45 (E). At this time, the sum of the coefficients is not always one, which will be described hereinafter. In addition, the allocation and conversion of the data are accomplished by different circuits, but they can be accomplished by a single circuit.

Then, the data thus having subjected to the data conversion are binarized using the error diffusion method (F and G), and the binarized data (H and I) are printed by respective heads.

Figure 12:
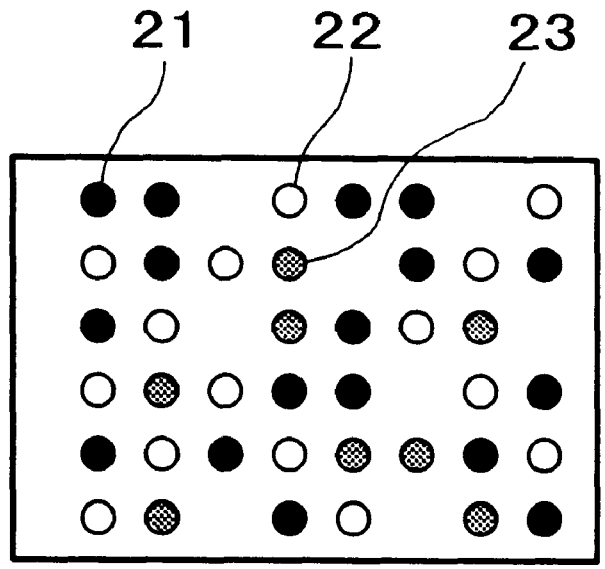
FIG. 12 shows positions of dots when the overlaying printing is effected by ideal front head and rear head according to the present invention.

FIG. 12 shows the results of overlaying printing provided by the front heads and the rear heads using the image processing method according to the present invention (solid image), when the physical accuracy is ideal. Designated by 21 (black dot) is the result of print by the front head, and designated by 22 (white dot) is the result of print by the rear head. Designated by 23 (hatched dot) is the result of print by both of the front head and the rear head. There are pixels which are not printed despite the printing is effected for a solid image, and there are pixels which are printed both by the front head and the rear head. This is because the multi-level image data are multiplied by different coefficients and are independently binarized. This is the very result of the reduction of the complementary relation between them.

Figure 13:
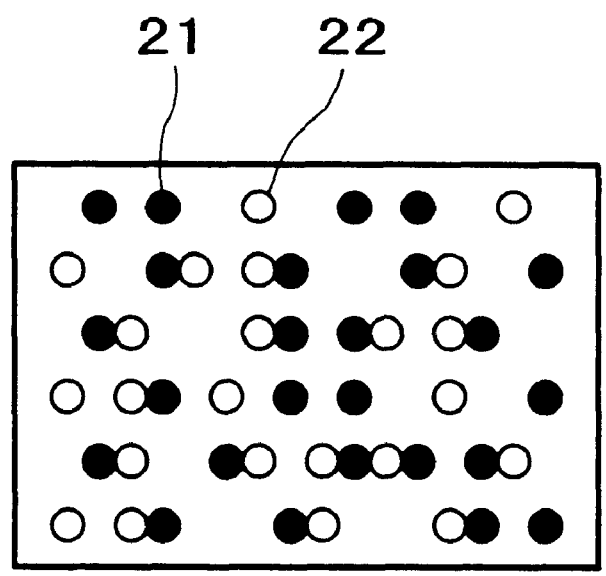
FIG. 13 shows positions of dots when the overlaying printing is effected by actual front head and rear head according to the present invention. Invention.

FIG. 13 deals with the case in which the registration between the front head and the rear head is slightly deviated. Here, deviation occurs in the lateral direction by one half dot. Dot. when FIG. 12 and FIG. 13 are compared, no significant difference is recognized in the image density. in other words, the density hardly changes even when the registration between scans slightly changes, and therefore, the half-pitch band non-uniformity does not occur.

In this embodiment, the data of the front head and the data of the rear head, both of which are multi-level data, are multiplied by different coefficients, and then, they are binarized, so that complementation relationship is reduced. Therefore, the influence of the change in the registration is reduced, and even when the registration changes slightly, the change or non-uniformity of the image density is smaller with reduced half-band non-uniformity.

Here, the description has been made with macroscopic complementary relationship using image provided by a plurality of scans, but the same applies microscopically. In such a case, when the dots provided by a plurality of scans are noted, it can be said relative relationship that adjacent to a dot provided by a scan, there is no dot provided by another scan.

FIG. 14 shows a specific example of steps 1005, 1006, 1007 in FIG. 10. In FIGS. 14A–D, the multi-level data (FIG. 14A) is allocated to image data (FIG. 14B) to be fed to the front head and the image data (FIG. 14C) to be fed to the rear head, and the thus allocated data are multiplied by the same coefficient (0.5) ticket The data (FIGS. 14D and 14E) having been subjected to the data conversion are binarized by the error diffusion method using different error distribution matrixes (FIGS. 14F, 14G), and the binarized data (FIGS. 14H and 14I) are printed by respective heads.

Although the multi-level data from which the data for the front head and the data for the rear head are the same, the complementary relation between the image provided by the heads is reduced so that half-band non-uniformity is reduced in the resultant image, since the error distribution matrixes for the error diffusion are different from each other.

(Embodiment 3)

FIG. 15 shows a specific example of steps 1005, 1006, 1007 shown in FIG. 10. In FIGS. 15A–I, the multi-level data (FIG. 15A) are allocated to the image data (FIG. 15B) to be fed to the front head and the image data (FIG. 15C) to be actuated to the rear head, and the thus audited multi-level data are multiplied by the same coefficient (0.5). The data (FIGS. 15D and 15E) having been subjected to the data conversion are binarized by an error diffusion method (FIGS. 15F and 15G) using different threshold levels, and the thus binarized data (FIGS. 15H and 15I) are printed by the respective heads.

Although the multi-level data from which the data for the front head and the data for the rear head are the same, the complementary relation between the images is reduced so that half-band non-uniformity is reduced, since the threshold levels of the error diffusion processes are different from each other.

The same effect can be provided when the elements of Embodiment 1-Embodiment 1-Embodiment 3, are combined (the data conversion for the front and rear heads, the error distribution matrixes of the error diffusion, and the threshold levels for the binarization).

(Embodiment 4)

FIG. 16 shows a specific example of states 1005, 1006, 1007 in FIG. 10. In FIGS. 16A–G, the multi-level data (FIG. 16A) are allocated to the image data (FIG. 16B) for the front head and the image data (FIG. 16C) for the rear head, and the thus allocated data are multiplied by the same coefficient (0.6). The data (FIGS. 16D and 16E) having been subjected to the data conversion are binarized by an error diffusion method (FIGS. 16F and 16G) using different error distribution matrix, and the binarized data are printed by the respective heads. Here, this embodiment is different from Embodiment 1 3 in that sum of the coefficients used in the data conversion process is larger than 1. More particularly, in Embodiment 4, the sum is 1.2. This means that printing is possible with a duty more than 100%.

In this embodiment, similarly to Embodiment 2 the data having been subjected to data conversion are binarized by the error diffusion method using different error distribution matrixes, and the binarized data are printed by the respective heads. However, the printing with the duty higher than 100% is possible if the use is made with the data conversion coefficient sum which is larger than 1, in Embodiment 1 and Embodiment 3. this applies to Embodiments 5 and 6.

(Embodiment 5)

Referring to FIG. 17, the embodiment will be described in which the gradation reduction is accomplished by use of dot diameter modulation and 4-level processing. This embodiment is the same as Embodiment 1 except for the use of 4-level processing as the gradation reduction process, and the multi-level data (FIG. 17A) are allocated to the data for the scanning number of data covering the same area (FIGS. 17B and 17C), and the allocated multi-level data are multiplied by different coefficients (0.55, 0.45). The thus converted data (FIGS. 17D and 17E) are converted to 4-level data by error diffusion method (FIGS. 17F and 17G), and the 4-level data (FIGS. 17H and 17I) are printed by the respective heads.

In the conventional 4-level processing, the complete complementary relation is used decay the images provided by the perspective heads, however, according to the present invention, the complementary relation between the heads is reduced by which the half-band non-uniformity is reduced in the resultant image.

Similarly to Embodiment 1–3, the same effect can be provided by the use of the error distribution matrixes or the threshold levels in the error diffusion method are made different.

(Embodiment 6)

This embodiment relates to the case having one head for one color. Referring back to FIG. 10, the image processing of this embodiment is realized by replacing the F (front) head with a first scanning and by replacing the R (rear) head with a second scanning.

Figure 18:
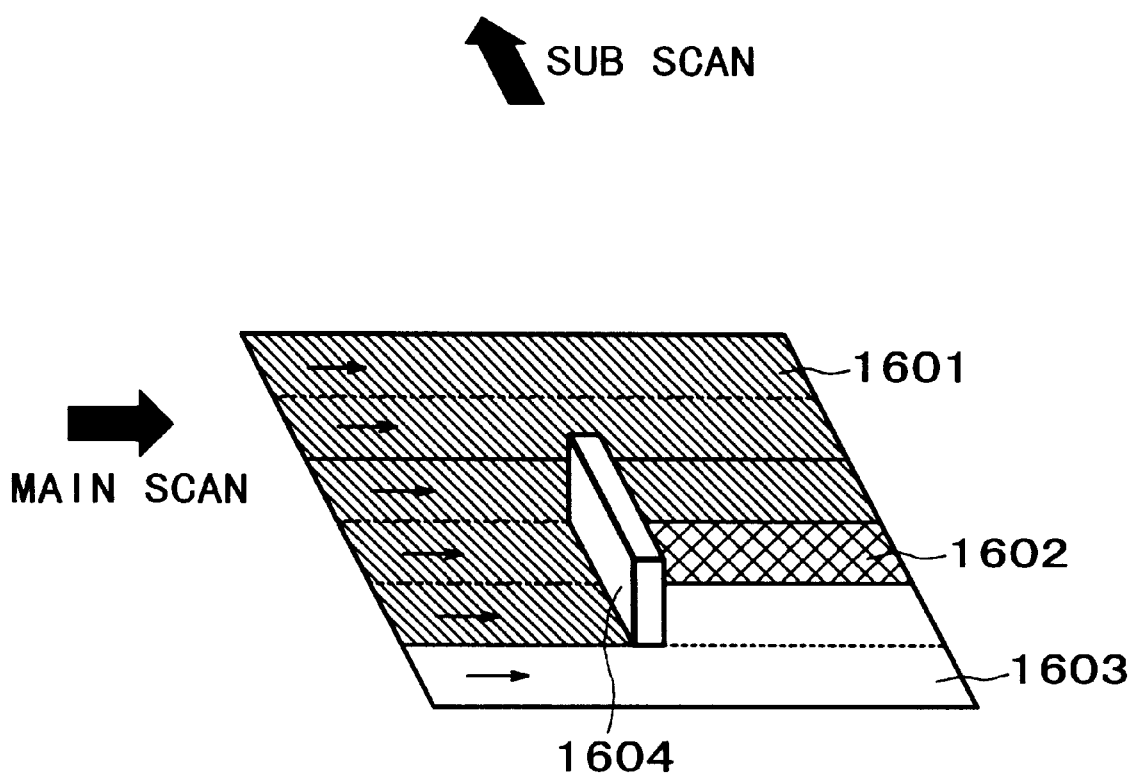
FIG. 18 illustrates overlaying state in a printed image in each scanning of a printer having one head per color, to which the present invention is applicable.

FIG. 18 shows an overlaying state in the printed image provided by the first and second scans. The feeding distance of the media corresponds to half-band, and the image is formed by the first scanning and the second scanning with half-band overlaying.

FIG. 19 shows a specific example of process corresponding to FIG. 10. In FIG. 19, similarly to Embodiment 1-Embodiment 3, the multi-level data (FIG. 19A) are allocated to the number (the number of scans for the same area) of data (FIGS. 19B and 19C), and the allocated data are subjected to data conversion with predetermined coefficients (0.55 for the first scanning, and 0.45 for the second scanning) (FIGS. 19D and 19E). The converted data are binarized by error diffusion method (FIGS. 19F and 19G), and the binarized data (FIGS. 19H and 19I) are printed through the first scanning and the second scanning.

Even when the error occurs in the feeding of the media in the sub-scan direction or when the registration slightly changes, half-band non-uniformity is not significant in the image since the complementary relation is reduced between the prints provided by the plurality of scan.

The same effect can be provided when the use is made with the error distribution matrixes or the threshold levels in the error diffusion method similarly to Embodiment 1-Embodiment 3.

(Embodiment 7)

Figure 20:
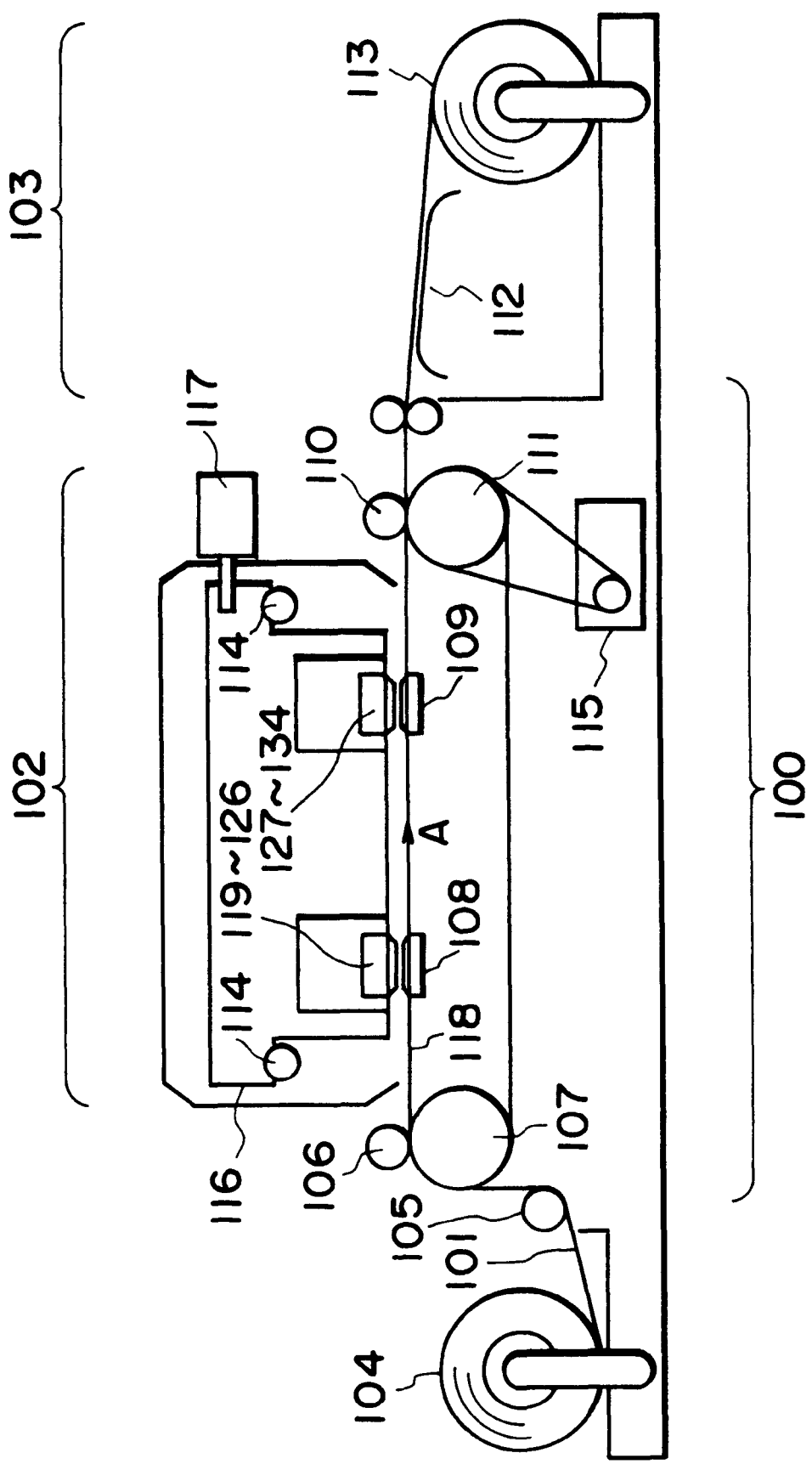
FIG. 20 is a sectional view of a full-color ink jet textile printing apparatus using a seventh embodiment of the present invention.

This embodiment shows an example in which the present invention is used in an ink jet type textile printing machine. FIG. 20 is a sectional view of a full-color ink jet recording apparatus.

In FIG. 20, designated by 100 is a feeding portion for feeding textile 101 (recording material or medium); 102 is a printer unit for effecting printing; 103 is a winding unit for winding the recording material 101 up; 104 is a feeding roller on which the recording material 101 is wound; 105, 106 are confining rollers; 107 is a driving roller; 108, 109 are platen portion for maintaining the flatness of the print portion; 110 is a confining roller; 111 is a driving roller; 112 is a dry portion; 113 is a winding roller; 114 is a support for supporting the carriage 116; 117 is a motor for scanningly moving the carriage unit in the main scan direction. Driving rollers 107 and 111 are driven by the The conveyer belt 118 is stretched between the driving rollers 107 and 111 with the scanning region of the carriage unit 116 therebetween, and adhesive material is applied on the outside surface thereof. When the rollers are driven by the feeding motor 115, the bonding strength and frictional force relative to the recording material 101 function to assist the carrying of the recording material in the direction A.

The carriage unit 116 moves in the horizontal plane above the post 114 by the carriage motor 117. Then, the printing is carried out by the ink jet head 119–134 provided on the unit 116. The elements 119–126 are disposed at an upstream side in the feeding path of the recording material 101, namely, closer to the feeding roller 102. Designated by 119 is a first magenta head provided with a plurality of ejection outlets for effecting magenta ink; 120 is a first yellow for ejecting a yellow ink; 121 is a first orange head for ejecting orange ink; 122 is a second light magenta head for ejecting light magenta ink; 123 is a first cyan head for ejecting cyan ink; 124 is a first light cyan head for ejecting light cyan ink; 125 in a first blue for ejecting blue; 126 is a first black head for ejecting black ink.

The ink jet heads 127–134 is disposed at a downstream side in the feeding path for the recording material, namely after the ink jet head 119–126. It is disposed such that scans of the ink jet heads 127–134 and the ink jet heads 119–126 are deviated by a distance which is one half of the with. Thus, they are defeated by 0.5 band with. Among those heads, designated by 127 is a second magenta head for ejecting magenta ink; 128 is a second yellow head for ejecting yellow ink; 129 is a second orange head for ejecting orange ink; 130 is a second light magenta head for ejecting light magenta ink; 131 is a second cyan head for ejecting cyan ink; 132 is a second light cyan head for ejecting light cyan ink; 133 is a second blue.

Therefore, in this embodiment, 8 sets of the recording heads for ejecting 8 different color inks, and the corresponding recording heads are deviated by 0.5 band width in the recording material 101 feeding direction. The cyan and magenta images are formed by dark cyan ink and light cyan ink, dark magenta ink and magenta ink.

Figure 21:
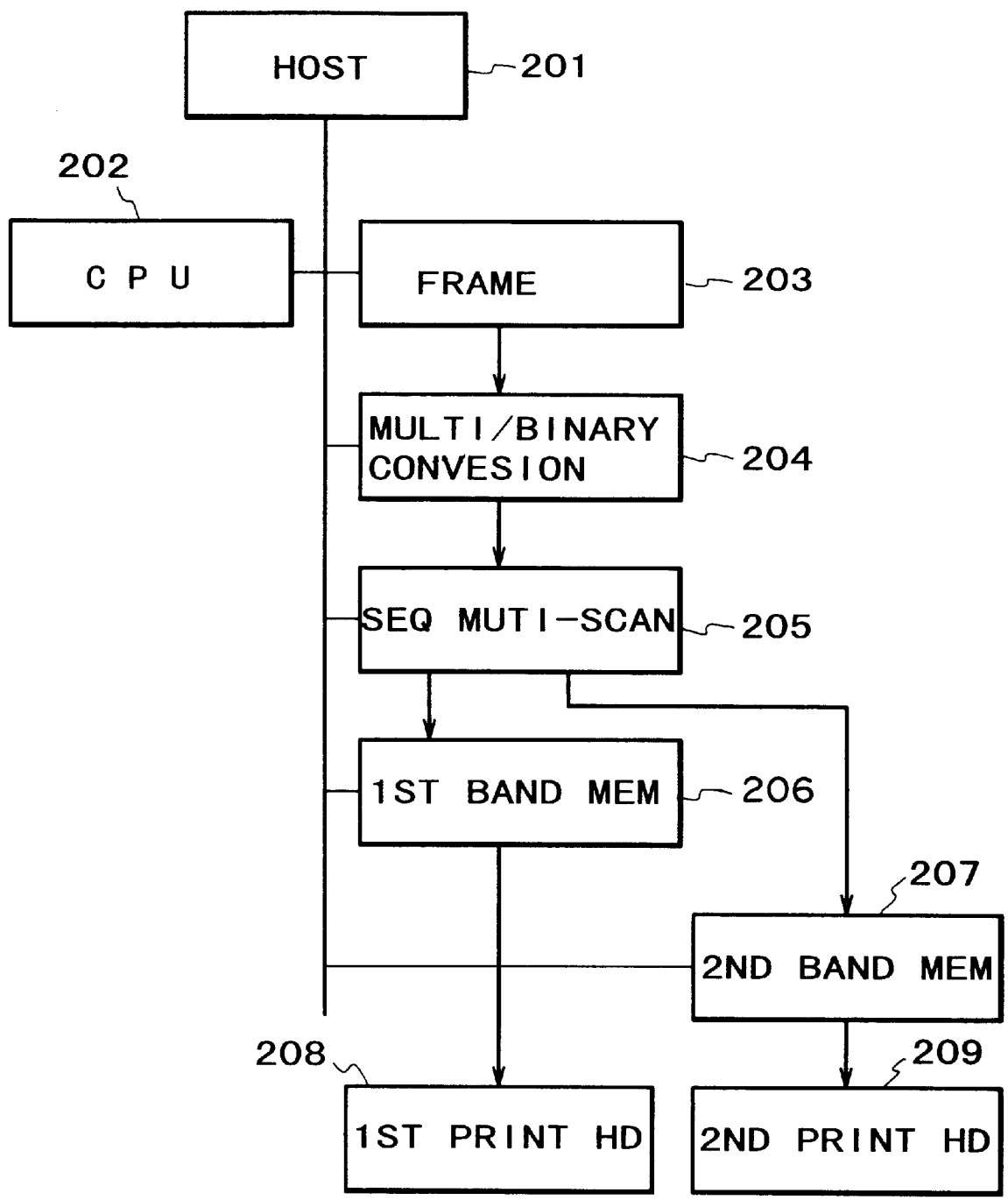
FIG. 21 is a block diagram showing a flow of image data process used in the seventh embodiment of the present invention.

FIG. 21 is a block diagram of control system used in the ink jet printer shown in FIG. 20. In FIG. 21, designated by 201 is a host computer for controlling the ink jet textile printing system.

The printed image data are transferred from the host computer who GPIB (General Purpose Interface Bus) interface, are temporarily stored in frame memory 203 under the control of the CPU202. The CPU203 is responsive to a print start command produced by the host computer to read out of the printed image data in the frame memory 203 by the amount corresponding to one scanning width through a multi-level/binary exchange portion 204 to the sequential multi-scan portion 205. The sequential multi-scan portion 205 allocates the printed image data to first band memory 206 and second band memory 207. The image data in the first band memory 206 and the second band memory 207 are read out in accordance with a unidirectional printing or bi-directional printing sequence, and are printed by the first print head 208 corresponding to the ink jet heads 119–126 in FIG. 1, and the second print head 209 corresponding to the ink jet heads 127–134 in FIG. 1. From the second band memory 207, the image data are supplied to the second print head 209 with the time delay corresponding to 0.5 band width so that the relative position in the width scan direction of the first print head 206 and the second print head 207.

Figure 22:
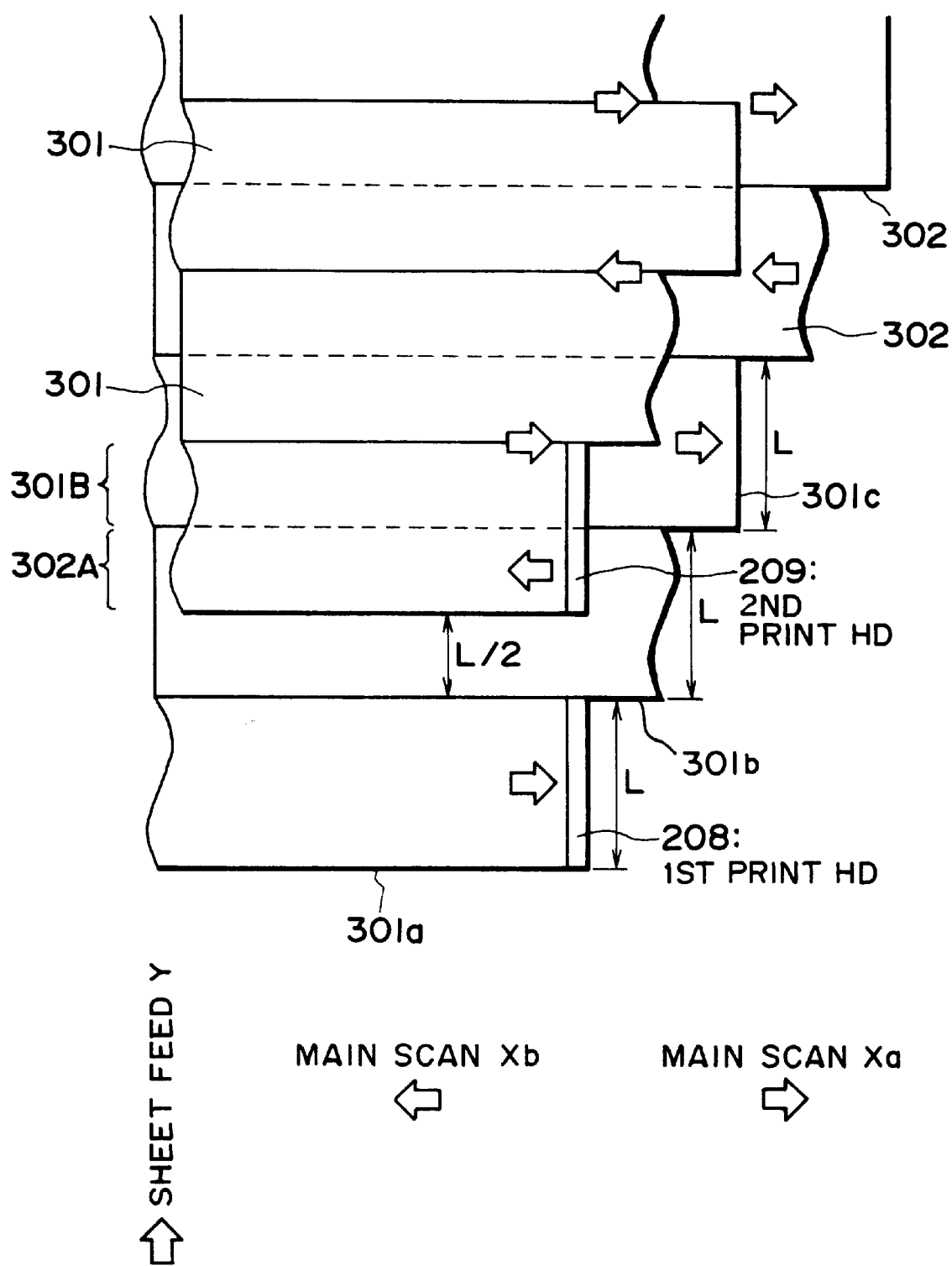
FIG. 22 is an illustration of a recording method using sequential multi-scan used in the seventh embodiment.

FIG. 22 shows printing process by the printer unit 102 of the ink jet textile printing shown in FIGS. 20 and 21.

Here, the first print head 208 connected to the first band memory is disposed and then upstream side with respect to the feeding direction Y of the recording material, and effect the first print on the recording material 101.

In the printing operation, the image is recorded or printed in accordance with the recording data in the first band memory 206 provided by allocation algorithm of the sequential multi-scan. Using all of the ejection outlets of the first print head 208, the recording is effected on the portion 301a of the recording material by the forward scan Xa.

The recorded or printed portion 301a is fed through a predicament distance corresponding to the width of the ejection outlet arrangement of the head, and is then placed as a region 301b for the recording of the second print head 209. For the region 301b, the printing is effected by the second print head in accordance with the recording data in the second band memory 207 allocated through the multi-scan type. As described in the foregoing, the positions of the first print head 208 and then second print head 209 are deviated from each other by ½ the width L of the ejection outlet array. Therefore, the upstream half of the ejection outlets of the second print head 209 are used, and the printing in the backward scan Xb is effected on the region 302A corresponding to the downstream half of the region 301b already printed by the first print head.

Then, the recording material is fed by a distance corresponding to the width L of the ejection outlet array, and when the region 301b of the recording material 101 is placed as a region 301c, the printing is effected by the forward scan Xa on the upstream half region 301B of the region 301c already printed by the first print head 208, using the downstream half of the ejection outlet of the second print head 209. In this manner, the printing is carried out, the region printed by the first print head 208 and the second print head 209 are indicated by reference numeral 302.

As described in the foregoing, in this embodiment using the multi-scan type the respective lines in the region 302 are printed by the inks ejected through different ejection outlets of the first print head 208 and the second print head 209. In other words, the data for printing are divided for the first and second printing heads 208 and 209, and the areas printed by the first print head 208 and the second print head 209 are different (the upstream half and the downstream half), so that density non-uniformity and/or the strikes due to the variations in the ejection outlet diameters and the ejecting directions or the like of the ejection outlets can be diffused.

Figure 23:
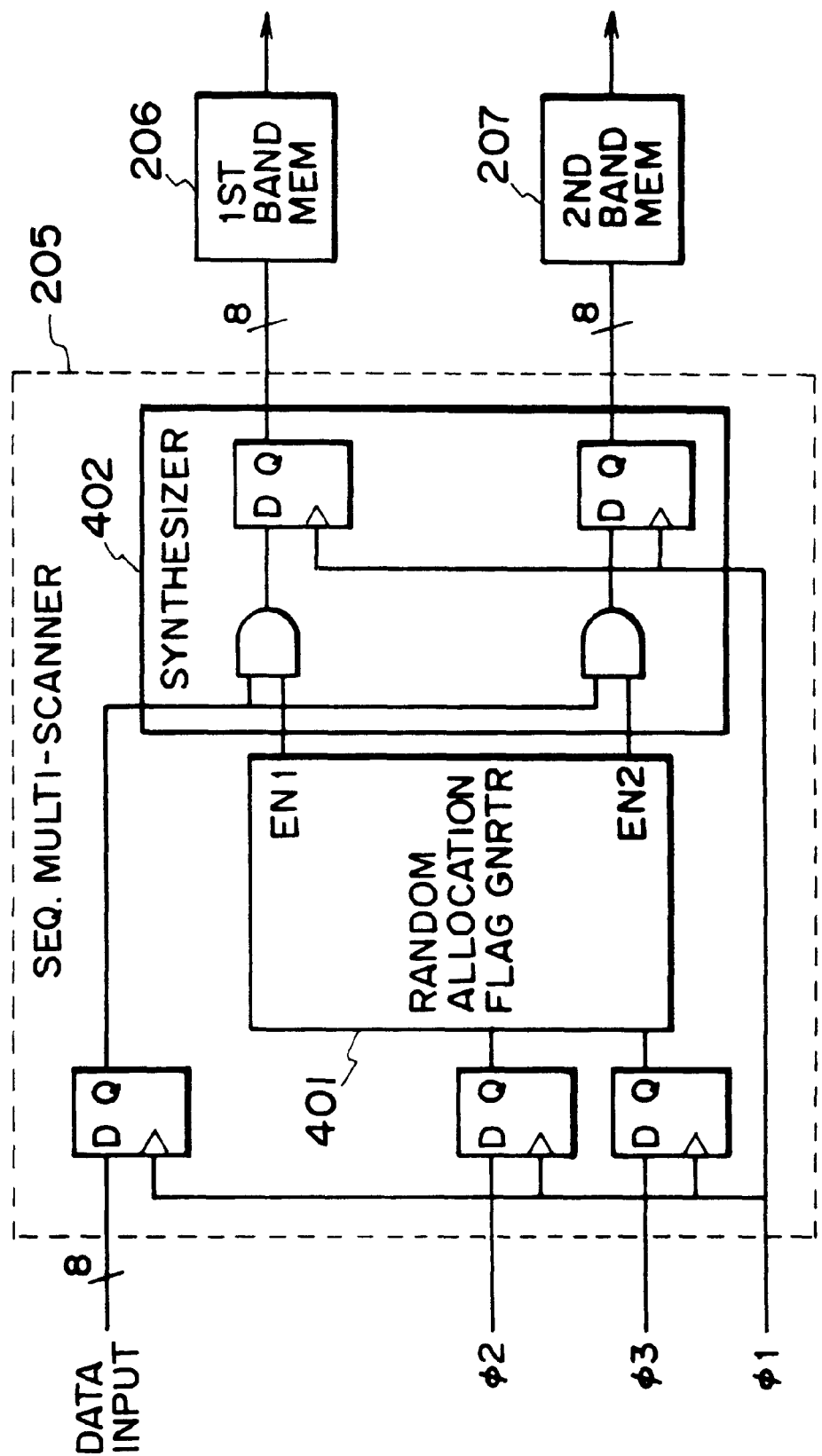
FIG. 23 is a block diagram showing a structure of executing portion for the sequential multi-scan used in the seventh embodiment of the present invention.

FIG. 23 is a block diagram of a circuit in the sequential multi-scan portion 205 for allocating and supplied the recording data in accordance with the multi-scan type shown in FIG. 22. Here, the recording data are allocated to the first magenta head 119 and to the second magenta head.

In FIG. 23, a random distributing flag generator 401 produces first allotting flag (EN1) and second allotting flag (EN2) in synchronism with synchronization clock $\phi 1$ for the transfer of the recording data, from the random number generation clock $\phi 2$ and $\phi 3$ ($\phi 1 \neq \phi 2 \neq \phi 3$). The results of logical AND processing of the allotting flags and the recording data are supplied to the first band memory 206 or to the second band memory 207, thus allotting the recording data. At this time, (1) when EN1="H", EN2="L";
The data are allocated only to the first print head 208.
(2) when EN1="L", EN2="H";
The data are allotted only to the second print head 209.
(3) when EN1="H", EN2="H";
The data are allotted to both of the first print head 208 and the second print head 209.
(4) when EN1="L", EN2="L";
The data are not allotted to any (the recording data output is L).

In this embodiment, the recording data are outputted with random switch by the synthesizing portion 402 in synchronism with the synchronization clock $\phi 1$ for the transfer of the recording data in accordance with the allotting flag which is produced at random. The synthesizing portion 402 has a 1 bit structure, but the recording data is transferred with 8 bit unit. Therefore, it is provided with input buffer (parallel/serial) and output buffer (serial/parallel).

Figure 24:
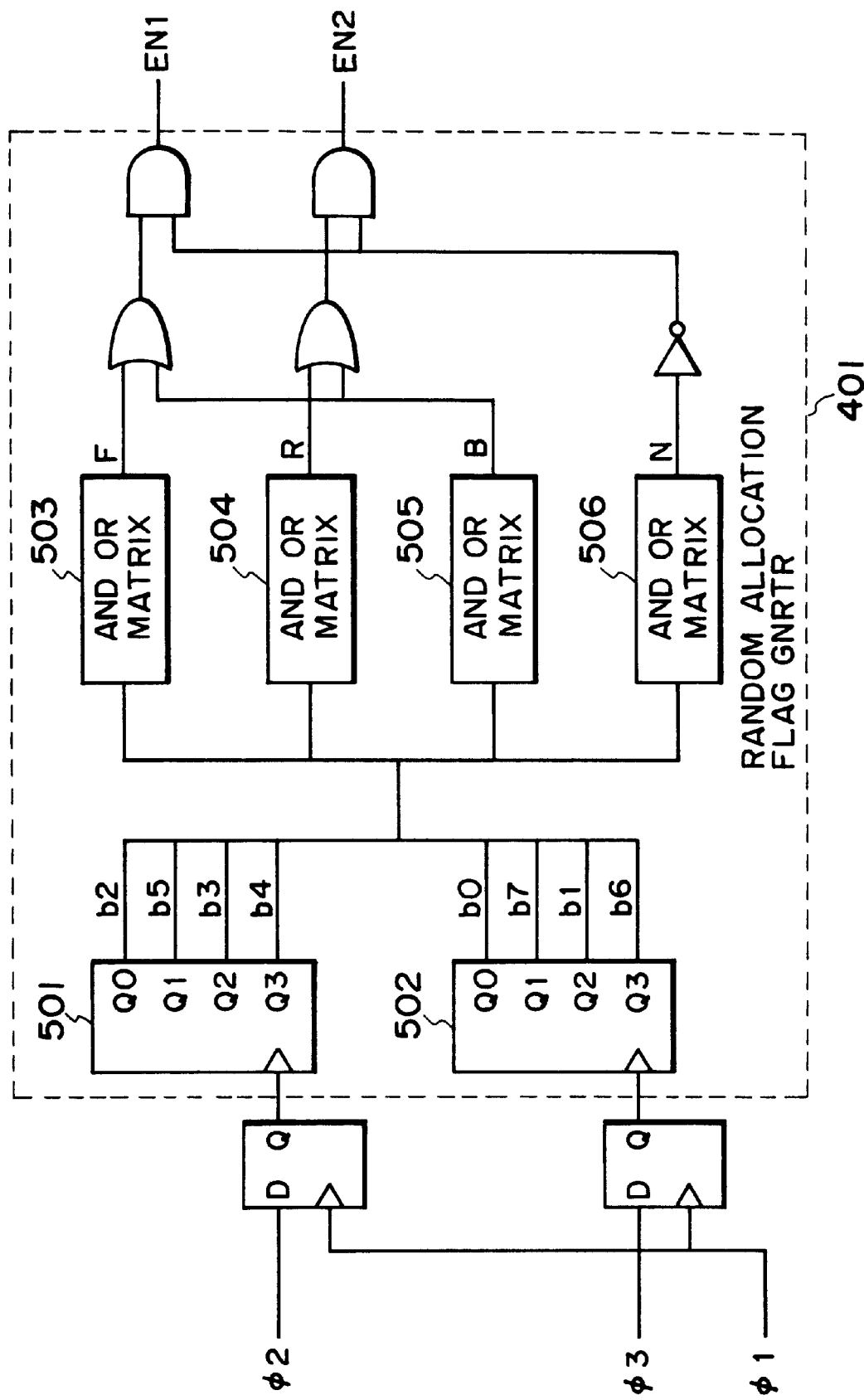
FIG. 24 is a block diagram showing a structure of a random distribution flag generation portion used in the seventh embodiment of the present invention.

FIG. 24 is a block diagram of the random allotting flag generator 401.

Figure 25:
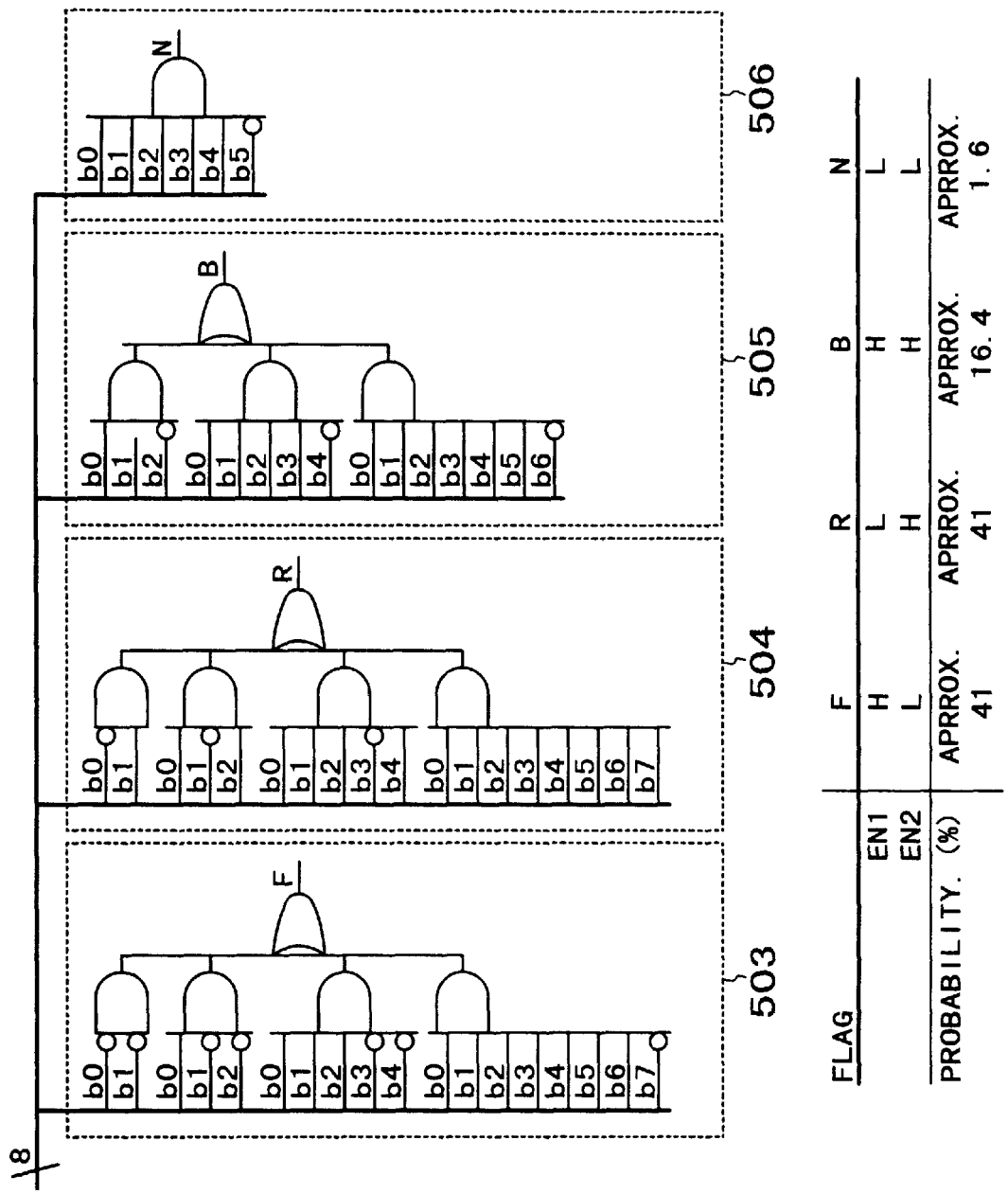
FIG. 25 is a block diagram showing a structure of an AND-OR matrix portion used in the seventh embodiment of the present invention. Invention.

In this embodiment, 256 non-synchronization clock $\phi 2$, $\phi 3$ are produced by counters 501 and 502, respectively. Respectively. They are subjected to the discrimination by the AND-OR matrixes 503, 504, 505, 506 to determine the occurrence probability for each of the above-described said (1), (2), (3) and (4). FIG. 25 shows a block diagram and a table used in the AND-OR matrixes 503, 504, 505, 506

According to this structure, when the count is 0–63, 128–159, 224–231 or 254, the flag signal F indicative of feed of the image data only to the first band memory 206 in the AND-OR matrix 503. The occurrence probability is approximately 41% (105/256=41.015625%).

When the count is 64–127, 160–191, 232–239 or 255, the flag signal R indicative of feed of the image data only to the second band memory 207. The occurrence probability is approximately 41% (105/256=41.015625%).

When the count is 192–223, 240–247, 252 or 253, a flag signal B indicative of feed of the image data to both of the first band memory 206 and the second band memory 207. the occurrence probability is approximately 16.4% (42/256= 16.40625%).

When the count is 248–251, the flag signal B indicative of no feed of the image data in the AND-OR matrix 506. The occurrence probability is approximately 1.6% (4/256= 1.5625%).

In this embodiment, by changing the structure of AND-OR matrix 503 504, 505, 506, the occurrence probabilities in (1), (2), (3) and (4) can be selected with gradation of approximately 0.39% (0.390625%).

Referring back to FIG. 12, it may be deemed as a result of overlaying printing using the first print head and the second print head in accordance with the image processing method of the present invention in the case of the solid image on the assumption that physical accuracy is ideal. In this case, black dot 21 indicates the prints provided by the first print head, and white dot 22 indicates the prints provided by the second print head. Designated by 23 indicates the prints provided by both of the first print head and the second print head. there are non-print pixels or there are pixels which are printed by both of the first print head and the second print head, despite that image data represent a solid image. This is because the occurrence probabilities of (1), (2) are not 0. In this manner, the complementary relation is reduced.

Referring back to FIG. 13, it can be deemed as being the result when the registration is slightly deviated between the first print head and the second print head. In this case, the first print head is deemed as being laterally deviated by half dot. When FIG. 12 and FIG. 13 are compared, it will be understood that change of the image density is significant. Therefore, it is understood that even if the registration slightly changes, the density hardly changes so that half-band non-uniformity is not produced.

In this embodiment, similarly to the conventional example, the binarized image data are allotted, but the data are allotted or not allocated at random to the first print head and the second print head, so that complementary relation is reduced. Therefore, the influence of the change in the registration is small, so that image density change is smaller than in the case of the complete complementary relation, when the registration changes slightly. Therefore, the images can be formed with reduced half-band non-uniformity.

As described in the foregoing, the difference of the interval between unit recording elements overlaid through multi-scan due to the error in the mounting accuracy among the recording heads, can be diffused, so that moire effect and/or the half-scan pitch non-uniformity can be reduced.

(Embodiment 8)

Figure 26:
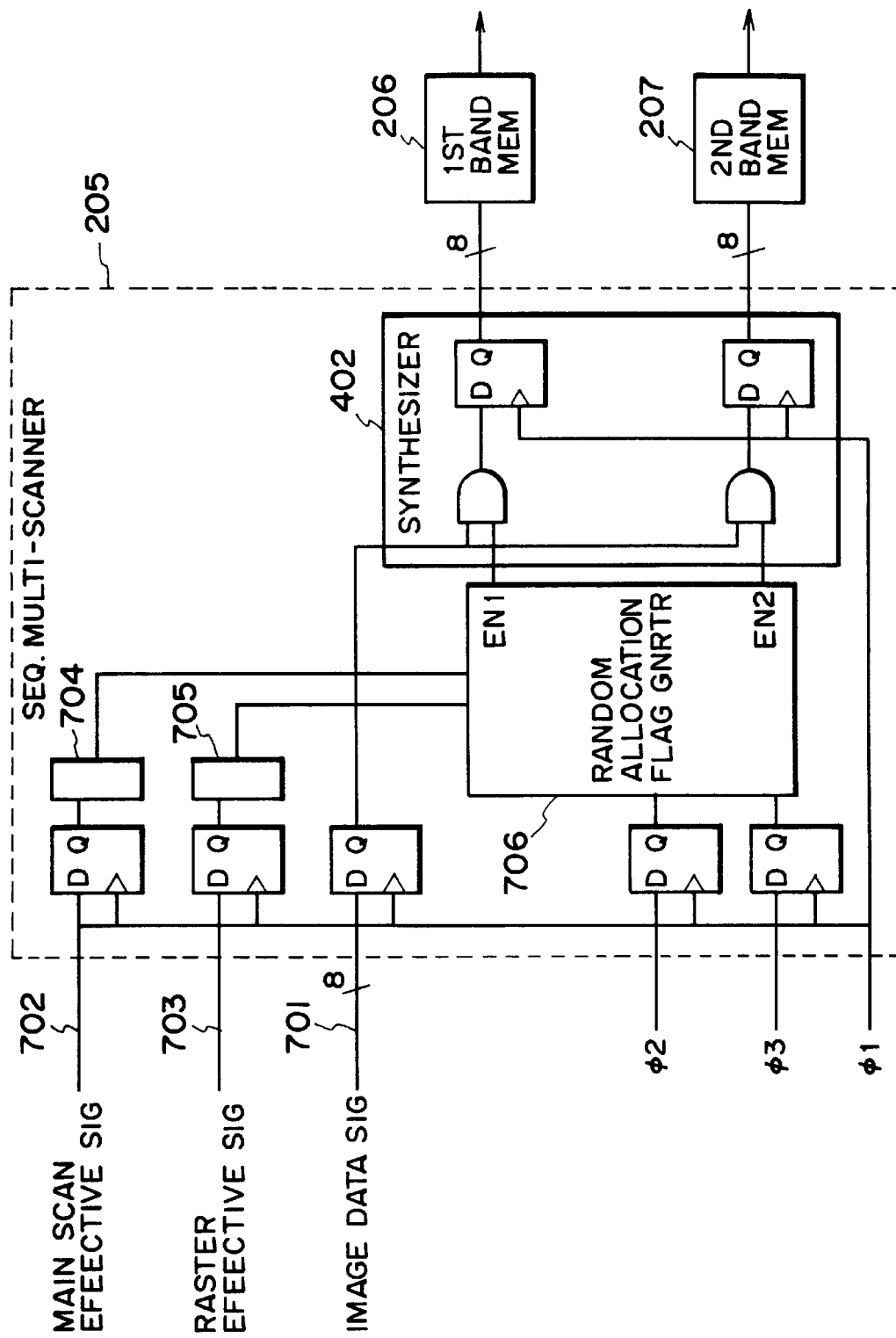
FIG. 26 is a block diagram showing a structure of an executing portion for the sequential according to the eighth embodiment of the present invention.

FIG. 26 is a block diagram of another structure of the sequential multi-scan for allotting and supplied the recording data in accordance with the multi-scan type shown in FIG. 22. Here, the recording data are allotted to the first magenta head 119 and the second magenta head 127.

Figure 27:
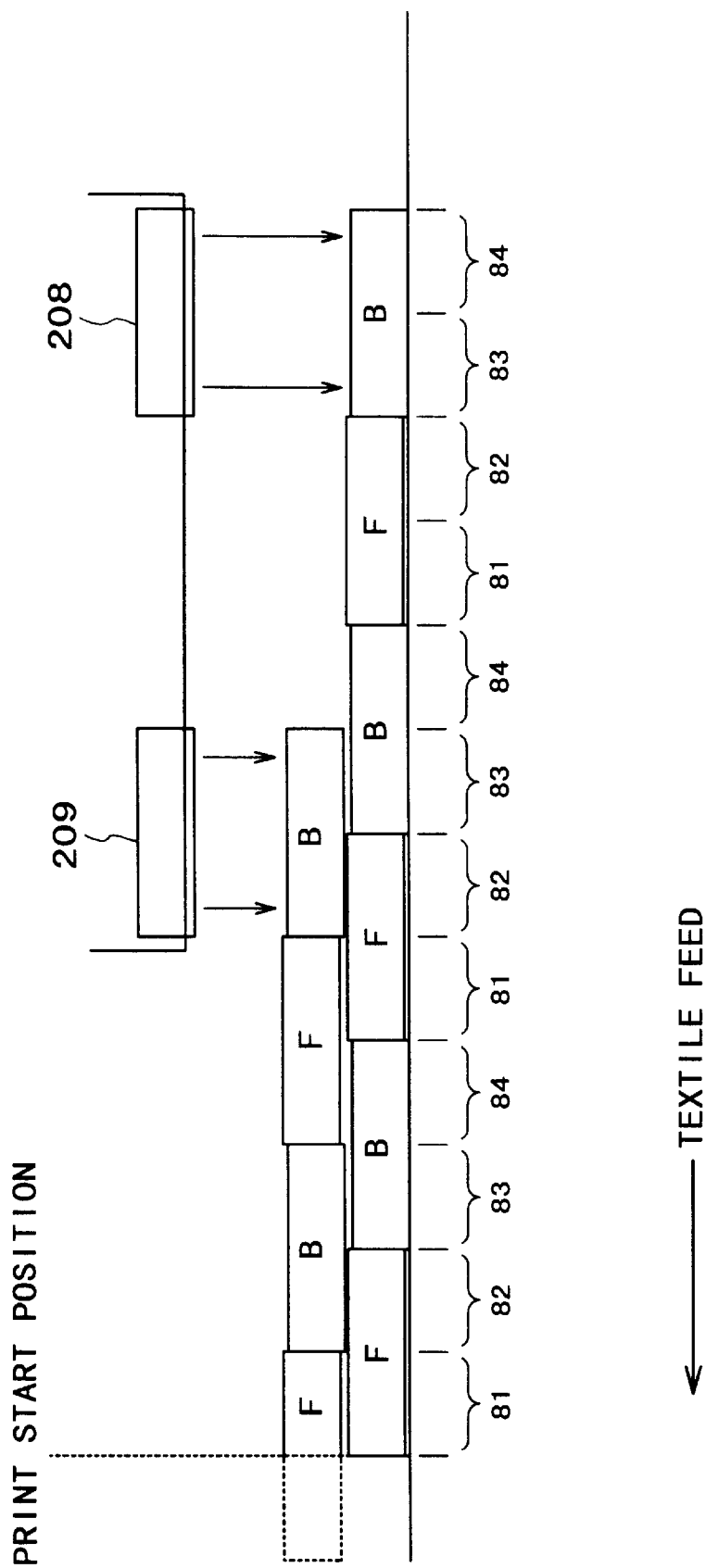
FIG. 27 is an illustration of a recording method using the sequential multi-scan according to the eighth embodiment of the present invention.

In FIG. 26, the same reference numerals as in FIG. 23 are assigned to the elements having the corresponding functions, and detailed description are omitted for simplicity. In FIG. 26, designated by 701 is an image data signal; 702 is a signal indicative of image data effective period in one main-scanning synchronized with the image data signal; 703 is a signal indicative of image data effective period in a raster scan line synchronized with image data signal; 704 is a main-scanning direction discrimination portion which counts the effective period signal 702 of the image data in one main-scanning from the start of the printing operation to discriminate whether the cult is odd number or even number; 705 either ejecting position discrimination portion for counting the effective period signal 703 of the image data in the raster scan line to discriminate whether the ejecting position of the image data is at the upstream half or the downstream half of the recording head. FIG. 27 is an illustration of an operation of the random allotting flag generator 706 in FIG. 26. Here, the first print head 208 repeats forward printing, backward printing, forward printing, backward printing with reciprocal movement thereof. The second print head 209 effects the first forward print by the upstream half of ejection outlets in the second forward printing operation of the first print head 208, when the mounting position of the second print head 209 is 1.5times the band width away, and thereafter, it repeats backward path, the forward print, the backward print and so on. Therefore, the overlaying print condition in terms of the main-scanning directions of the first print head and the second print head are the following four:

First print head=forward path+second print head=forward path . . . 81

First print head=forward path+second print head=backward path . . . 82

First print head=backward passage+second print head=backward path . . . 83

First print head=backward passage+second print head=forward path . . . 84

And, from the start of the printing attention, the following is repeated:

81->82->83->84->81->82->83

Figure 28:
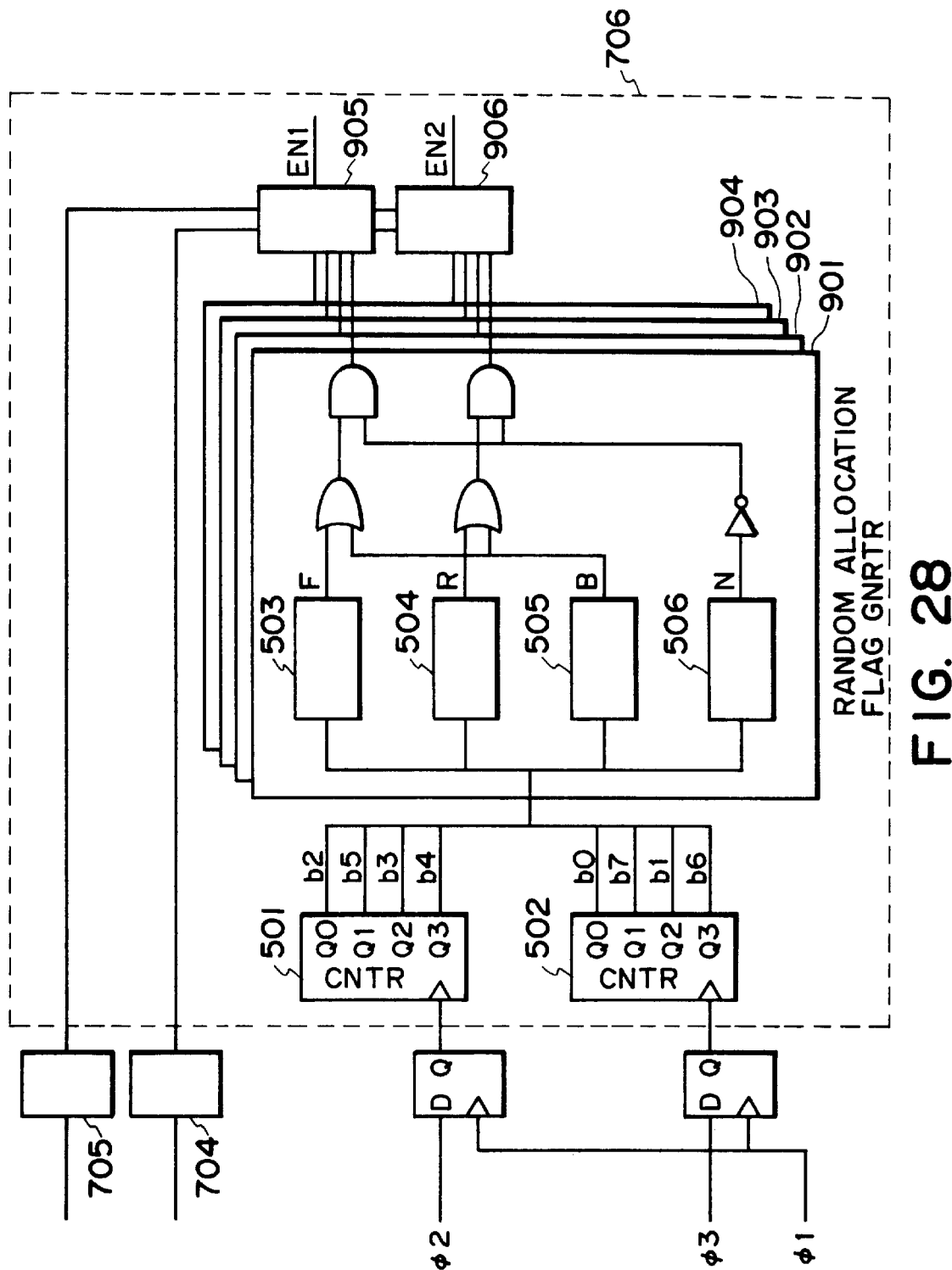
FIG. 28 is a block diagram showing a structure of a random distributing flag generator according to the eighth embodiment of the present invention.

FIG. 28 is a block diagram of the random allotting flag generated 706.

In this embodiment, there are provided four AND-OR matrixes 901, 902, 903, 904 corresponding to the overlaying print conditions 81–84 in terms of the main-scanning directions of the first print first print head and the second print head, and the occurrence probability of the allotting conditions said (1)–(4) is switched during the printing operation.

FIG. 29 shows an example of setting in the AND-OR matrix group 901, 902, 903, 904. This example is suitable for the case of the following printing properties of the recording head:

Density in the forward path print<density in the backward path print

By setting the allocation in the forward path print which is relatively higher, the density difference between the forward scan and the backward scan is avoided.

In the condition 81 (first/second: forward path/forward path), the probability of allocation to the first print head 208 and the second print head 209 is both approximately 10%, so that print density is raised to 110%, by which the density decrease in the forward path printing is prevented.

In the condition 82 (first/second: forward path/backward passage), the probability of allotment to the second print head 209 is lowered to provide the print density of 100%, and the backward print frequency of the second printing head 209 is reduced to approximately 45%.

In the condition 83 (first/second: backward passage/backward passage), the probability of non-allotment either to the first printing head 208 or the second printing head 209 is approximately 10%, so that print density is lowered to 90%, by which the density rise in the backward path printing is suppressed.

In the condition 84 (first/second: backward passage/forward path), the probability of allotment to the first print head 208 is lowered to provide the print density of 100%, and the backward print frequency of the first printing head 208 is reduced to approximately 45%.

According to this embodiment the difference of the interval between the unit recorded pixel overlaid by the quantitative multi-scan due to the mechanical mounting accuracy difference between the recording heads, can be diffused, so that moire effect and/or the half-scan non-stripes can be reduced, and in addition the reciprocation non-uniformity due to the difference in the printing properties between the forward path and the backward passage, can be corrected.

In the foregoing Embodiments 7 and 8, the recording head includes the first and second heads with deviation in the sub-scan direction, and the image is formed by a plurality of scans for a predetermined region of the recording material by these heads. The present invention, however, is not limited to this example, but the plurality of scans can be accomplished by feeding the recording material through a distance smaller than the recording width of the recording head.

In the Embodiments 7 and 8, they image data are allotted to the plurality of (2) band memories by the random allocation flag generator, but as an alternative, independent random number generators may be provided corresponding to the plurality of band memories, and the image data may be allocated on the basis of the random number produced by the respective random number generators. In this case, the allocation is effected on the basis of the independent random numbers, so that complementary relation of the image data allotted to the memories is not complete.

What is important is that when the image data is allocated at random to the plurality of memories, the complementary relation of the images provided by the memories is not complete.

(Embodiment 9)

The fundamental structure in Embodiment 9 is similar to that of Embodiment 7 shown in FIG. 20.

Figure 30:
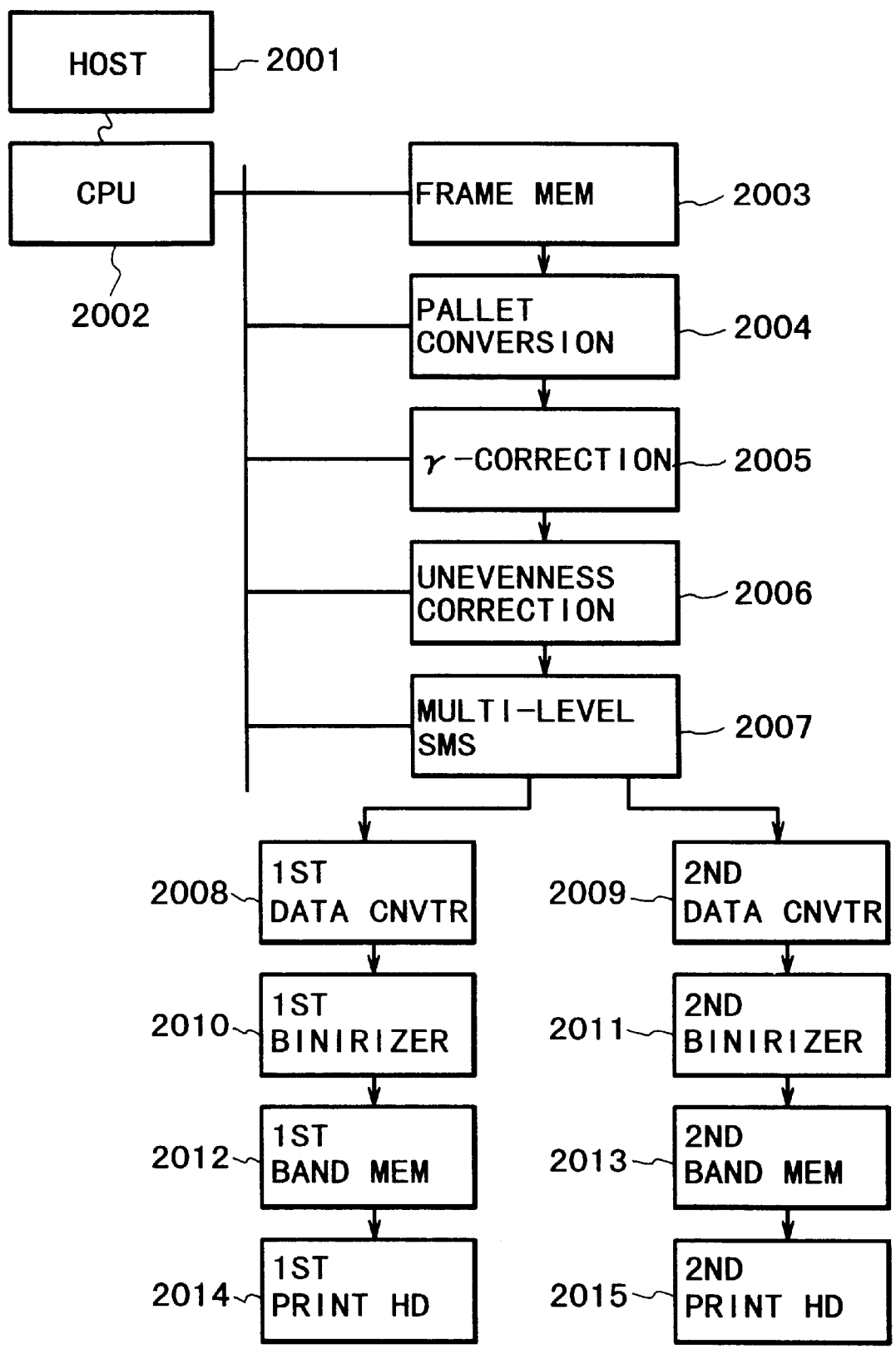
FIG. 30 is a block diagram showing flow of image data process in a full-color ink jet textile printing apparatus according to the ninth embodiment of the present invention.

FIG. 30 is a block diagram showing a control system of ink jet printer according to this embodiment. In FIG. 30, designated by 2001 is a host computer for controlling the ink jet textile printing system.

From the host computer, GPIB (General Purpose Interface Bus) the printed image data are temporarily stored in a frame memory 2003 in accordance with CPU2002 The CPU2002 reads out the data corresponding to one main-scanning width from the printed image data stored in the frame memory 2003 in accordance with the print start command produced by the host computer. The read out pallet data are converted to multi-level tone gradation image data corresponding to the coloring property of the ink color, by the pallet conversion portion 2004. The thus converted multi-level tone gradation image data are then subjected to so-called "gamma" conversion corresponding to the basic-ejection property of the recording head for each head by a "gamma" correction portion 2005, and the ejection property peculiar to the recording head is corrected by a non-uniformity correcting portion 2006. Then, the multi-level SMS portion 2007 allocates the data to the first recording head 2014 and the second recording head 2015.

The allocated multi-level tone gradation image data are subjected to a conversion process with the allocation coefficient by the first data converter 2008 and the second data converter 2009, and to the binarization of an error diffusion method using the error matrix and threshold at the first and binarization process portion 2010 and second binarization process portion 2011. The binary image data are stored in a first band memory 2012 and a second band memory 2013, and are read out in accordance with a unidirectional printing or bi-directional printing sequence under the control of the CPU2002, so that recording is effected by the first printing head 2014 and second printing head 2015.

The printing operation of the printer unit of the ink jet textile printing apparatus is the same as with FIG. 22.

Figure 31:
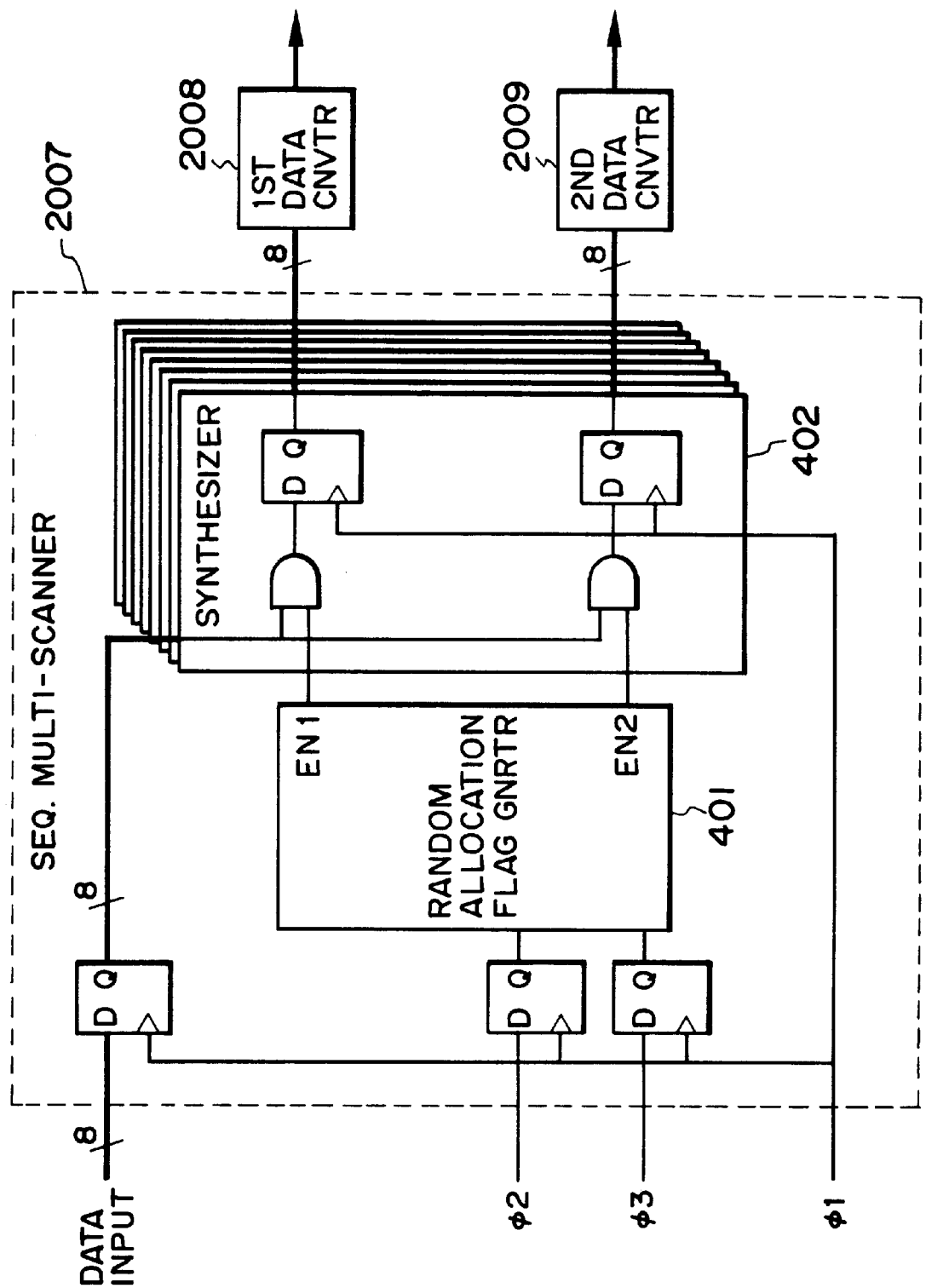
FIG. 31 is a block diagram showing a structure of a multi-level SMS executing portion used in the ninth embodiment of the present invention.

FIG. 31 is a block diagram showing a structure of a multi-level SMS portion 207 for allocating and supplying the multi-level gradation date through the multi-scan type process. The description will be made as to the case in which the recording data are located to the first magenta head and to the second magenta head.

In FIG. 31a random distributing flag generator 401 produces first allotting flag (EN1) and second allotting flag (EN2) in synchronism with synchronization clock φ1 for the transfer of the recording data, from the random number generation clock φ2 and φ3 (φ1 ≠φ2 ≠φ3). The results of logical AND processing of the allotting flags and the recording data are supplied to the first data converter 2008 or to the second data converter 2009, thus allotting the recording data. At this time, (1) when EN1="H", EN2="L":
The data are allocated only to the first data converter 2008:

(2) when EN1="L", EN2="H":
The data are allocated only to the second data converter 2009:

(3) when EN1="H", EN2="H":
The data are allocated to the first data converter 2008 and the second data converter 2009, equally:

(4) when EN1="L", EN2="L":
The data are not allotted either to the first data converter 2008 or to the second data converter 2009. (multi-level tone gradation image data output is "L").

In this embodiment, the recording data is rewritten at random by the synthesizing portion 402 and are outputted, in synchronism with the synchronization clock φ1 for the transfer of the recording data in accordance with the allocating flag outputted at random in accordance with the allocation conditions distribution condition (1)–(4). The synthesizing portion 402 in FIG. 31 has 1 bit structure, and it is constituted by 8 bits for the magenta color. The difference from FIG. 23 is in that in this embodiment, the image data are eight bits data, which are allocated, in FIG. 23, however, the data are 1 bit data for one pixel.

The block of the random allocation flag generator 401 is the same as with FIG. 24.

The structure of the AND-OR matrix 503 504, 504, 506 is the same as with FIG. 25, and the occurrence probabilities of (1), (2), (3) and (4) can be selected with gradation of approx. 0.39% (0.390625%). different conversion coefficient are multiplied to the allocated data using a look-up table (LUT) in the first data converter 2008 and the second data converter 2009.

Figure 32:
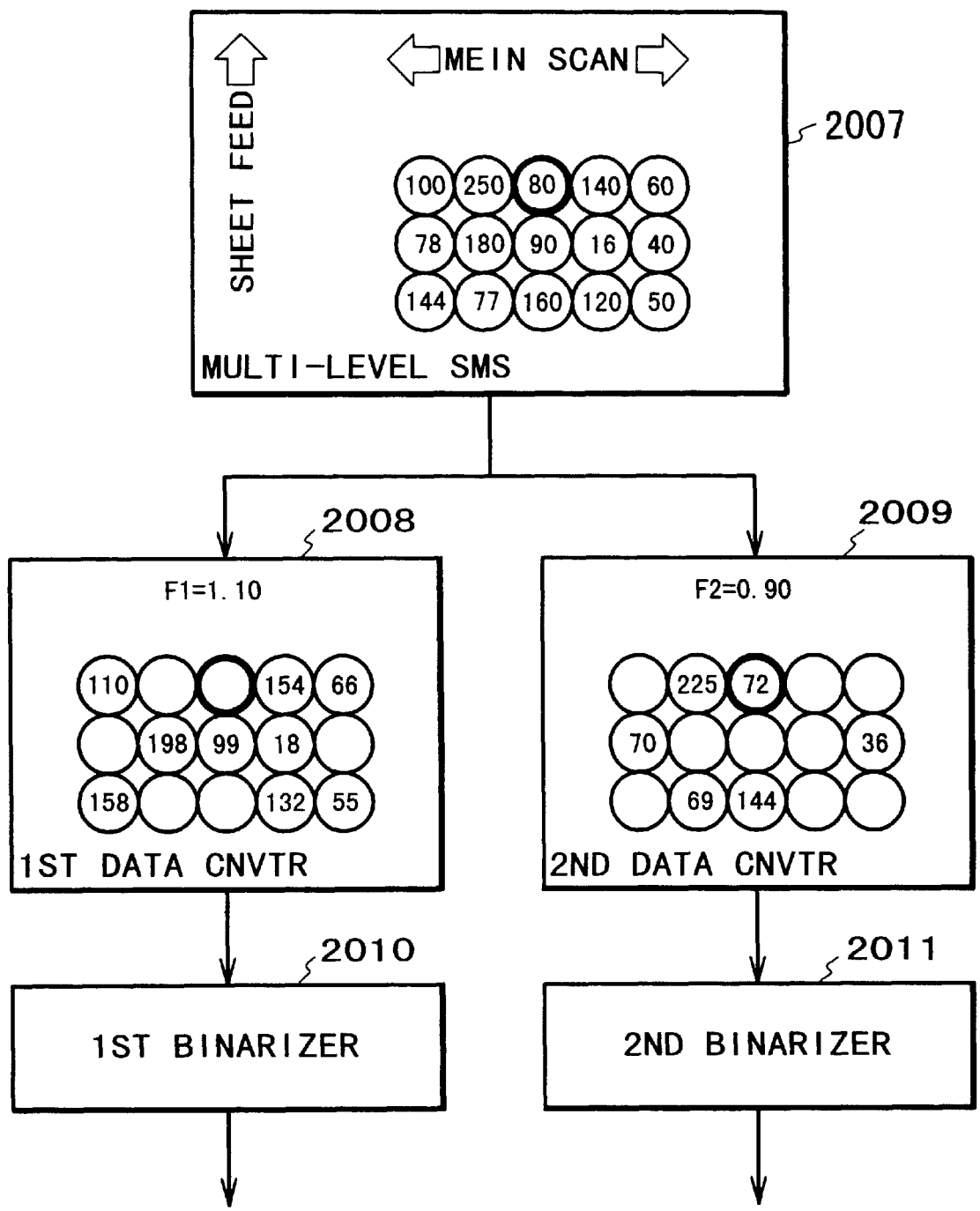
FIG. 32 illustrates a specific operation of the multi-level SMS executing portion and data converter used in the ninth embodiment of the present invention.

For example, in the specific example shown in FIG. 32, the multi-level gradation adjusting value for the noted pixel of the multi-level gradation image data allocated a random is multiplied by data conversion coefficient F1=1.10 for the first print head 2014 by the first data converter 2008, and by date conversion coefficient F2=0.90 for the second print head 2015 by the second data converter 2009. However, the sum of the coefficients is not 2. By adjusting the sum, the density of the image can be adjusted. The processing is carried out in exact synchronism with the speed of the image data transfer, and the data are supplied to the first binarization process portion 2011 end the second binarization process portion 2012.

In this embodiment, the multi-level tone gradation image data overlaid by quantitative multi-scan is allocated at random for unit pixel, so that complementing relation value is reduced, that is, non-complementation is accomplished. Therefore, the difference in the interval between unit recorded pixels due to the mechanical mounting accuracy difference between the recording heads can be diffused, so that moire effect and/or the half-scan non-uniformity can be reduced.

(Embodiment 10)

Figure 33:
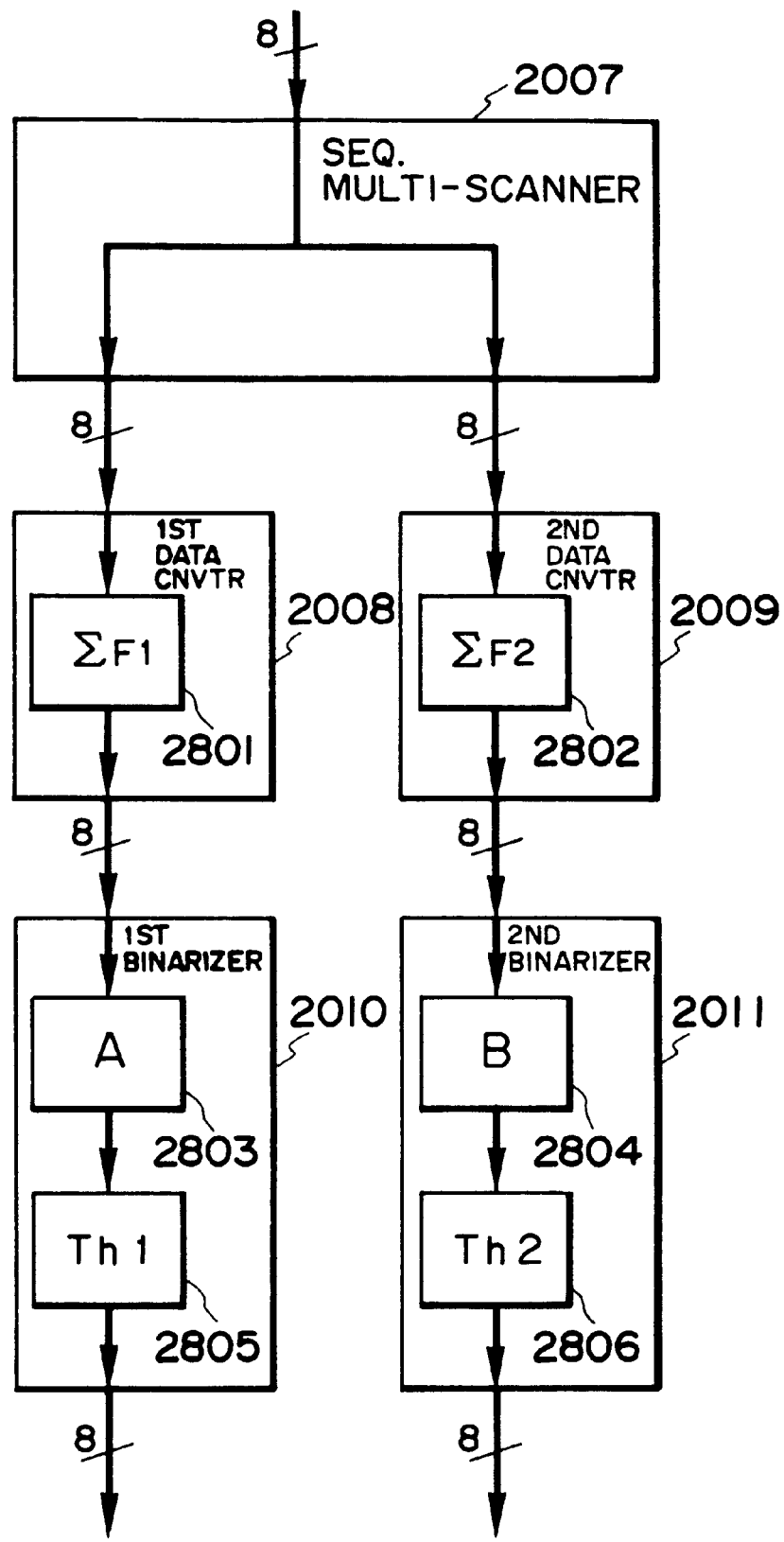
FIG. 33 is a block diagram showing a structure of a multi-level SMS executing portion, a data converter and a binarizing processor according to the tenth of the present invention.

FIG. 33 is a block diagram of a multi-level SMS process portion 2007 and a first data converter 2008 or a second data converter 2009 used in Embodiment 10. Here, the same reference numerals as in FIG. 30 are assigned to the elements having the corresponding functions, and the detailed description thereof has been omitted.

In the multi-level SMS process portion 2007, the multi-level tone gradation image data are equally allocated to the first printing head 2014 and the second printing head 2015.

The first data converter 2008 and the second data converter 2009 have look-up tables (LUT) 2801 and 2802 having different values so that multi-level tone gradation image data allocated are multiplied by effect coefficients.

In the first binarization process portion 2010 and the second binarization process portion 2011, each image data having been subjected to the data conversion, are further subjected to binarization processing using error diffusion method with different thresholds Th1 (2805) and Th2 (2806) and diffusion toward the marginal pixels using the error diffusion matrix A (2803) and error diffusion matrix B (2804) having different structures.

Figure 34:
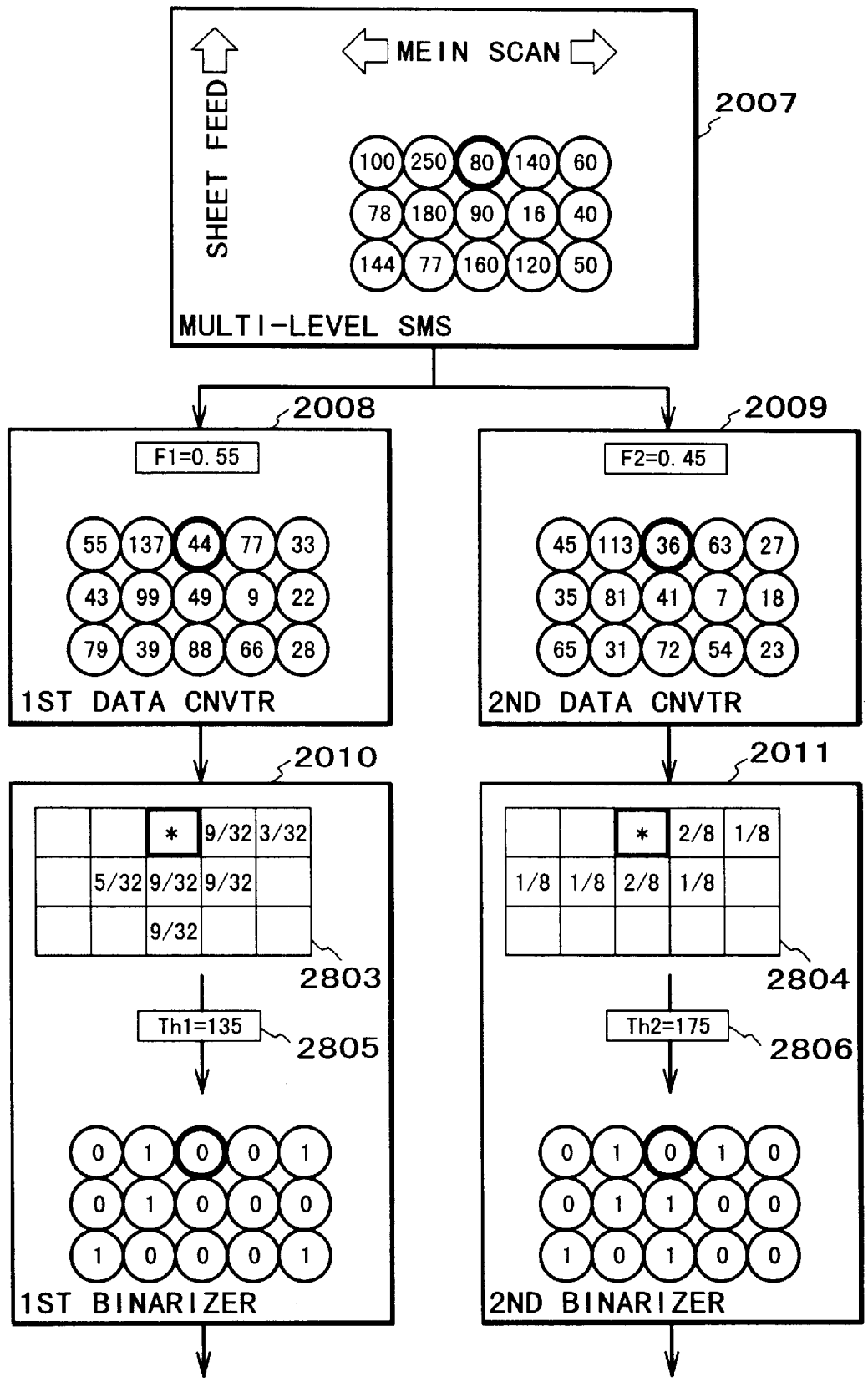
FIG. 34 illustrates a specific operations of the multi-level SMS executing portion and the data converter used in the tenth embodiment of the present invention.

For example, in FIG. 34, the multi-level gradation adjusting value (80) of the noting pixel having 8 bit structure is multiplied by a data conversion coefficient F1=0.55 (2801) for the first hand by the first data converter 2008, and is multiplied by a data conversion coefficient F2=0.45 (2802) for the second head by the second data converter 2009. At this time, the sum of the coefficients is not always 1. The processing operations are carried out in exact synchronism with the image data transfer speed, and the data are supplied the first binarization process portion 2010 and to the second binarization process portion 2011.

In the first binarization process portion 2010, $5/32$ or $9/32$ of the noting pixel value is added to the neighborhood by the error diffusion matrix A (2803), and in the second binarization process portion 2011, ⅛ or ⅜ is added to the neighborhood of the noting pixel by the error diffusion matrix B (2804). Thereafter, the binarization are carried out in the first binarization process portion 2010 using the threshold Th1= 135 and in the second binarization process portion 2011 using the threshold Th2=175 in synchronism with the image transfer speed.

According to this embodiment, the multi-level tone gradation image data to be overlaid through quantitative multi-scan are equally allocated, and therefore, the image data immediately after the deduction have a correlation. However, since the data conversion coefficients, the structures of the error diffusion matrix, and the binarized thresholds, are different distinctive, the complementary relation provided by the multi-scan is significantly reduced, by which qualitative difference can be diffused with the result of reduction of the half-scan interval non-uniformity.

(Embodiment 11)

Figure 35:
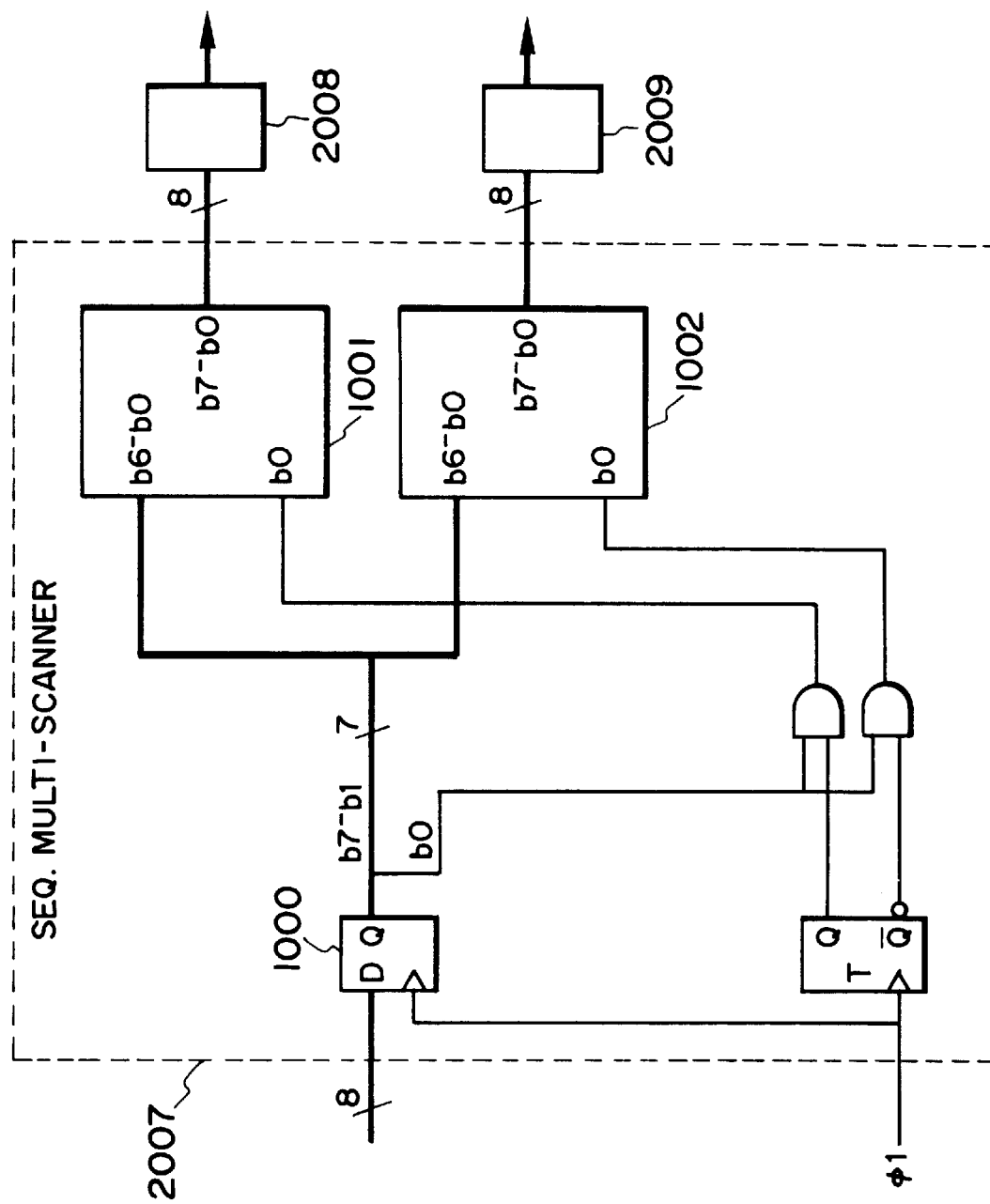
FIG. 35 is a block diagram showing a structure of a multi-level SMS executing portion according to the eleventh embodiment of the present invention.

FIG. 35 is a block diagram showing a structure of a circuit for allocating the recording data to the first magenta head 119 second magenta head 127 in the multi-level SMS portion 2007 in this embodiment. Here, the same reference numerals as in FIG. 30 are assigned to the elements having the corresponding functions, and the detailed description thereof are omitted for simplicity.

In FIG. 35, the multi-level tone gradation image data are shifted down by one bit approximately down to ½ level, and are inputted to the first +1 adder 1001 and to the second +1 adder 1002. The bit shift is carried out by shifting the output of the flip-flop 1000 to the first, and second adders 1001, 1002. The lowest bit b0 overflowed by the 1 bit shift-down, is alternately added in the form of 1 bits input to the first +1 adder 1001 and second +1 adder 1002 in synchronism with the image data transfer synchronization clock φ1. By doing so, the first, and second adders 1001, 1002 add the fractions resulting from dividing the data by 2.

Figure 36:
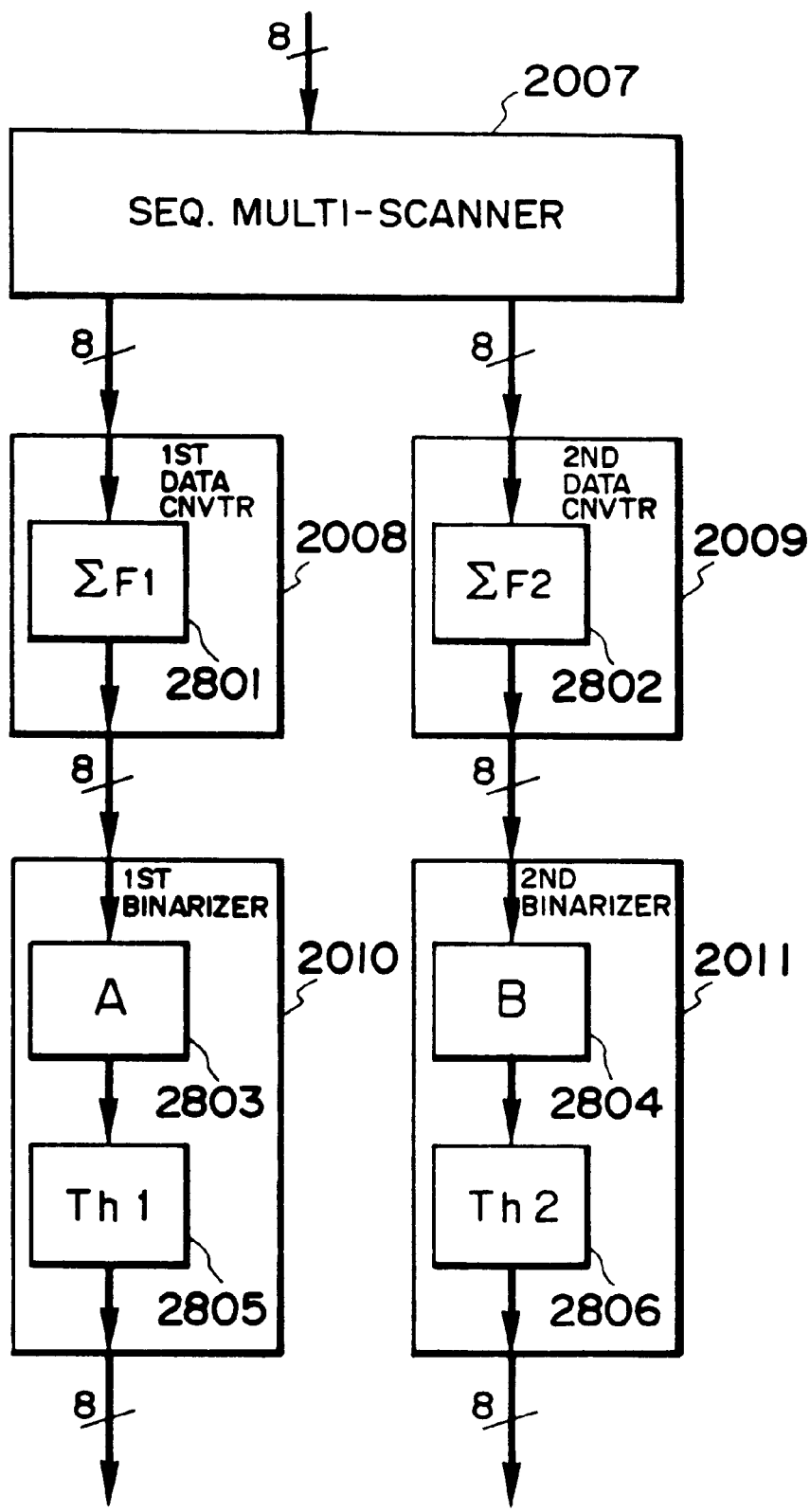
FIG. 36 is a block diagram showing structures of a multi-level SMS executing portion, a data converter and are a binarizing processor.

FIG. 36 shows the specific example of the processes of a multi-level SMS process portion 2007, a first data converter 2008, are first binarization process portion 2010, or a second data converter 2009 and a second binarization process portion 2011. 2011. Here, the same reference numerals as in FIG. 30 are assigned to the elements having the corresponding functions, and the detailed description thereof are omitted.

The multi-level tone gradation image data are substantially equally divided into the data for the first printing head 2014 and the data for the second printing head 2015 by the multi-level SMS process portion 2007, and the data are supplied to the first data converter 2008 and to the second data converter 2009. The first data converter 2008 and the second data converter 2009 have different look-up tables (LUT) 2801 and 2802, so that different coefficients are multiplied to the allocated multi-level tone gradation image data. At this time, the densities for the heads are converted by the look-up tables (LUT) 2801 and 2802 in the first data conversion allocator 2008 and second data converter 2009.

In the first binarization process portion 2010 and the second binarization process portion 2011, the respective image data converted, are subjected to binarization processing using the error diffusion method with different thresholds and error diffusion matrixes having different structures.

Figure 37:
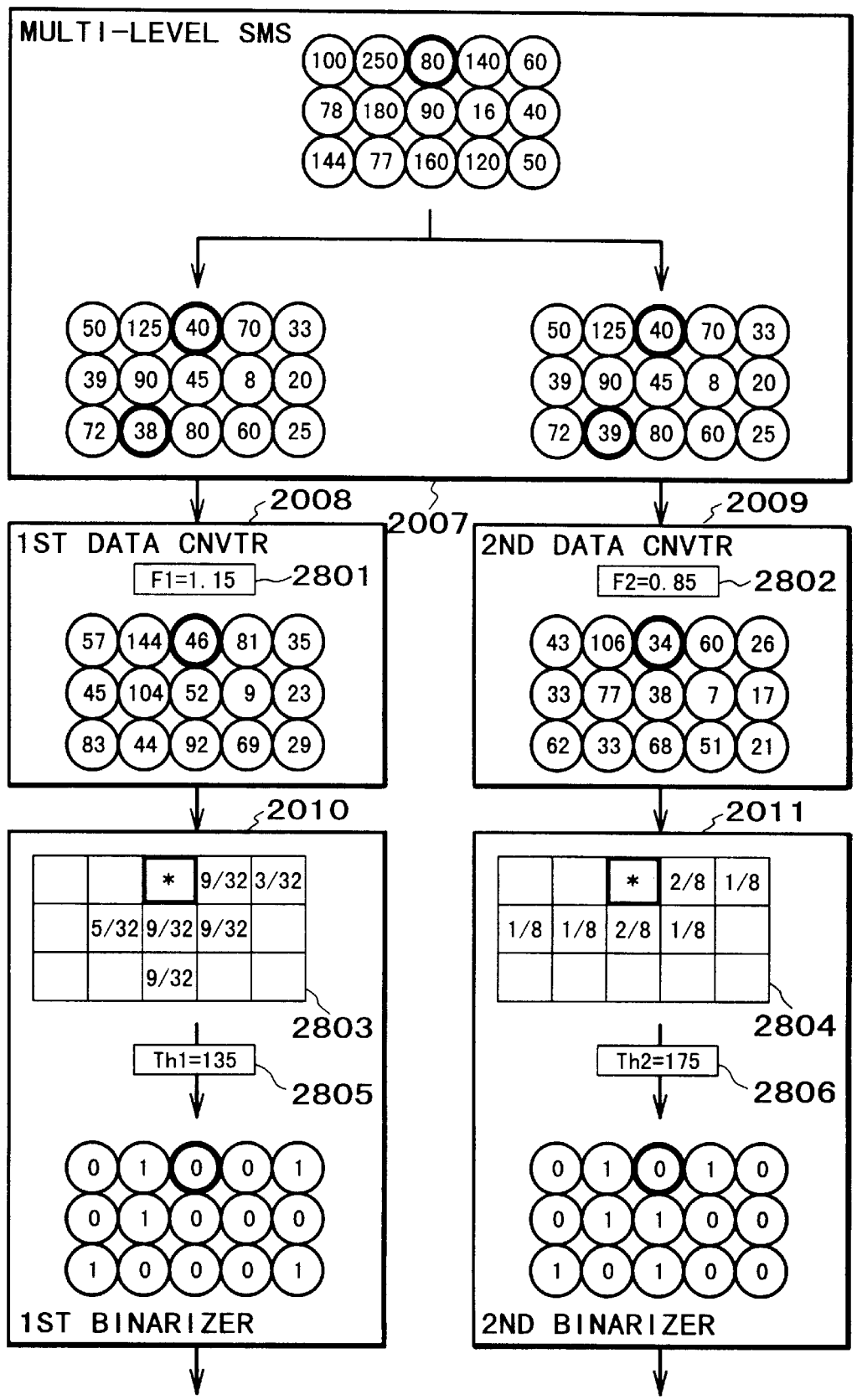
FIG. 37 illustrates specific operations of the multi-level SMS executing portion, the data converter and the binarizing processor according to the eleventh embodiment of the present invention.

In the specific example of processing shown in FIG. 37, the multi-level gradation adjusting value of the noting pixel of the multi-level tone gradation image data allocated by ½, for example, 80 is multiplied by a data conversion coefficient F1=1.15 for the first printing head 2014 by the first data converter 2008 (2801), and multiplied by a data conversion coefficient F2=0.85 for the second printing head 2015 by the second data converter 2009 (2802). However, the sum of the coefficients is not 2. The processing is carried out in exact synchronism with the speed of the image data transfer, and the data are supplied to the first binarization process portion 2010 and to the second binarization process portion 2011.

In the first binarization process portion 2010, 5/32 or 9/32 of the noting pixel value is added to the neighborhood of the noting pixel indicated by asterisk in the Figure by the error diffusion matrix A (2803), and in the second binarization process portion 2011, ⅛ or ⅜ of the noting pixel value is added to the neighborhood of the noting pixel by the error diffusion matrix B (2804), so that data are diffused to a plurality of pixels. Thereafter, the binarization is carried out in synchronism with the image transfer speed in the first binarization process portion 2010 using the threshold Th1= 135 and in the second binarization process portion 2011 using the threshold Th2=175.

According to this embodiment, the multi-level tone gradation image data to be overlaid by the qualitative multi-scan are allocated substantially to ½, and therefore, the image data immediately after the data allocation have a substantial correlation. However, since the data conversion coefficients, the structures of the error diffusion matrix and the binarized thresholds, are different, respectively, after the allocation, the complementary relation provided by the multi-scan is significantly reduced, so that quantitative difference can be diffused with the result of retention of half-scan pitch non-uniformity.

In this embodiment, the structures of first, and second data converters and the first, and second binarization process portion, are made different, but since the binarizing processor uses the error diffusion method, the difference is not inevitable. This is because even if the allocated image data involved a correlation, the correlation is reduced by the binarization.

(Embodiment 12)

Figure 38:
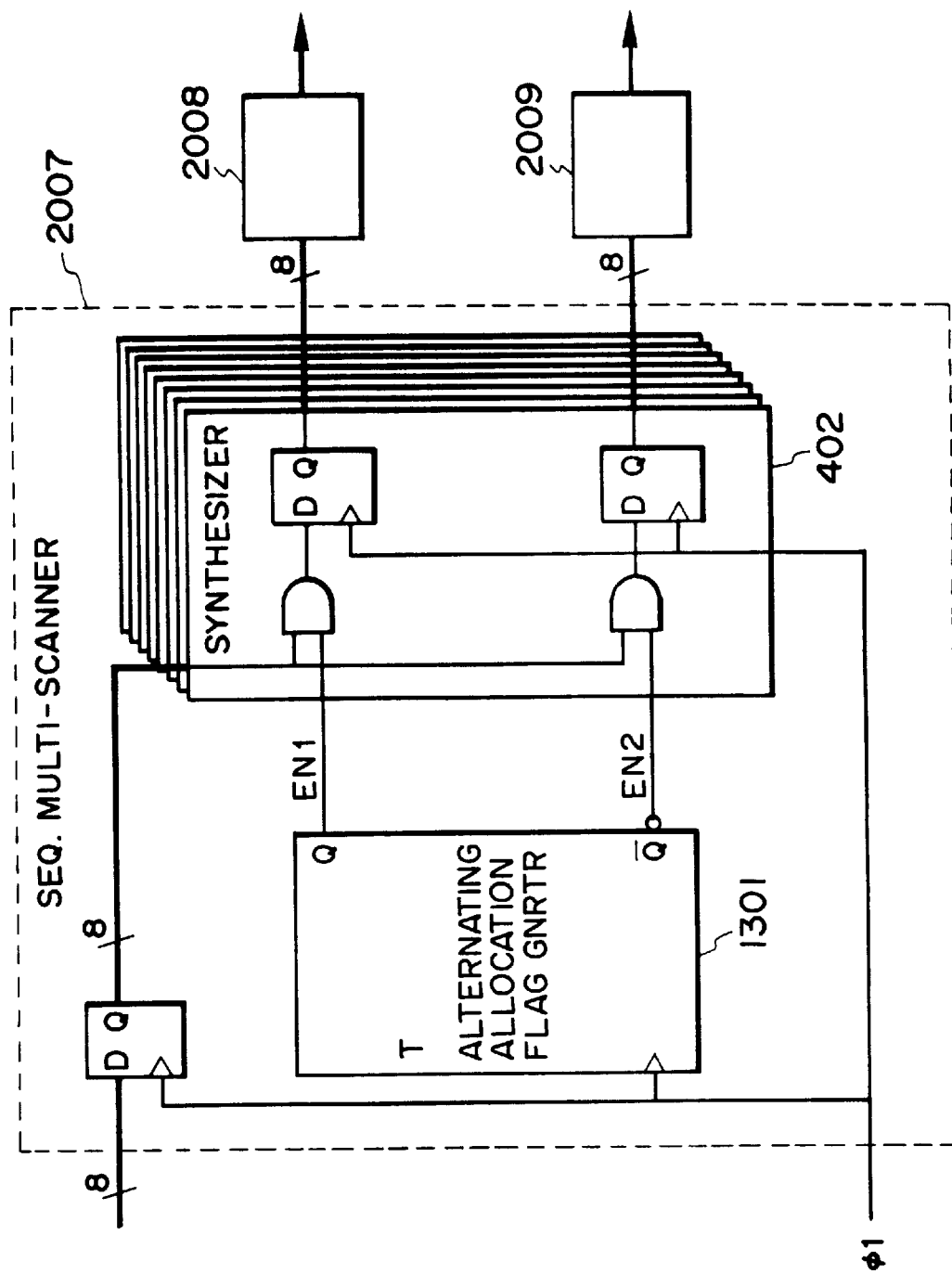
FIG. 38 is a block diagram showing a structure of a multi-level SMS executing portion according to the twelfth embodiment of the present invention.

FIG. 38 is a block diagram showing a structure of the circuit for allocating the recording data to the first magenta head 119 and to the second magenta head 127 in the multi-level SMS portion 2007 in this embodiment. Here, the same reference numerals as in FIG. 30 are assigned to the elements having the corresponding functions, and the detailed description thereof are omitted.

In FIG. 38, the alternating allocation flag generator 1301 generates alternately a first allocation flag (EN1) and a separate allocation flag (EN2) synchronized with the image data transfer synchronization clock φ1. A logical AND of the alternating allocation flag and the recording data is calculated and the resultants are alternately supplied to the first data converter 2008 or to the second data converter.

Figure 39:
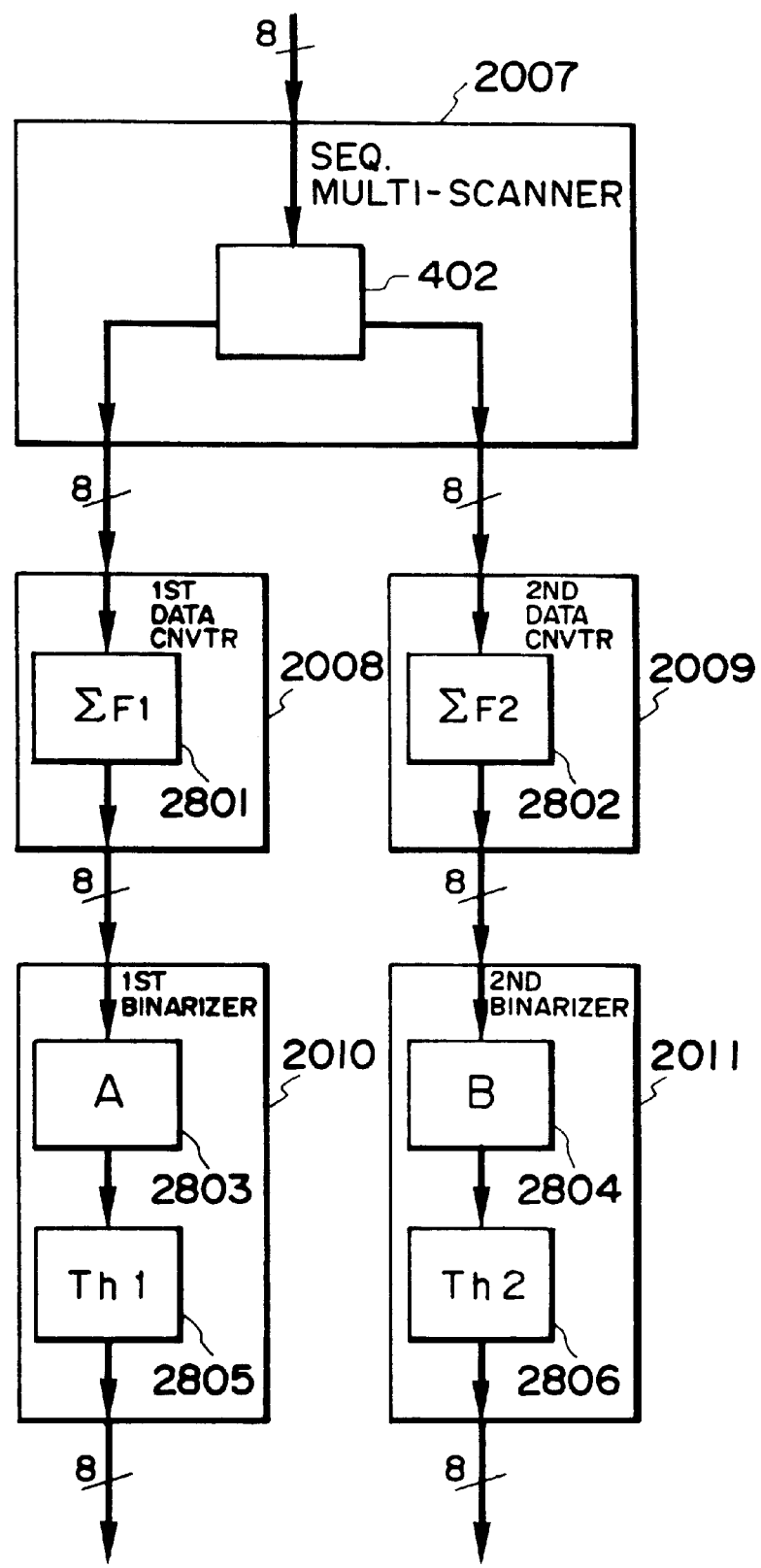
FIG. 39 is a block diagram showing structures of the multi-level SMS executing portion, data converter and the binarizing processor according to the twelfth embodiment of the present invention.

FIG. 39 shows a specific example of processes of the multi-level SMS process portion 2007, the first data converter 2008 and the first binarization process portion 2010 or the second data converter 2009 and the second binarization process portion 2011. Here, the same reference numerals as in FIG. 30 are assigned to the elements having the corresponding function, and the detailed description thereof are omitted.

The multi-level tone gradation image data are allocated toward the first printing head 2014 and toward the second printing head 2015 for each pixel by the multi-level SMS process portion 2007, and are supplied to the first data converter 2008 and to the second data converter 2009. The first data converter 2008 and the second data converter 2009 have look-up tables (LUT) 2801 and 2802 having different levels such that multi-level tone gradation image data are multiplied by different coefficients.

In the first binarization process portion 2010 and the second binarization process portion 2011, the image data having been subjected to the data conversion are further subjected to binarization processing using the error diffusion method with the error diffusion matrixes having different structures and using different thresholds.

Figure 40:
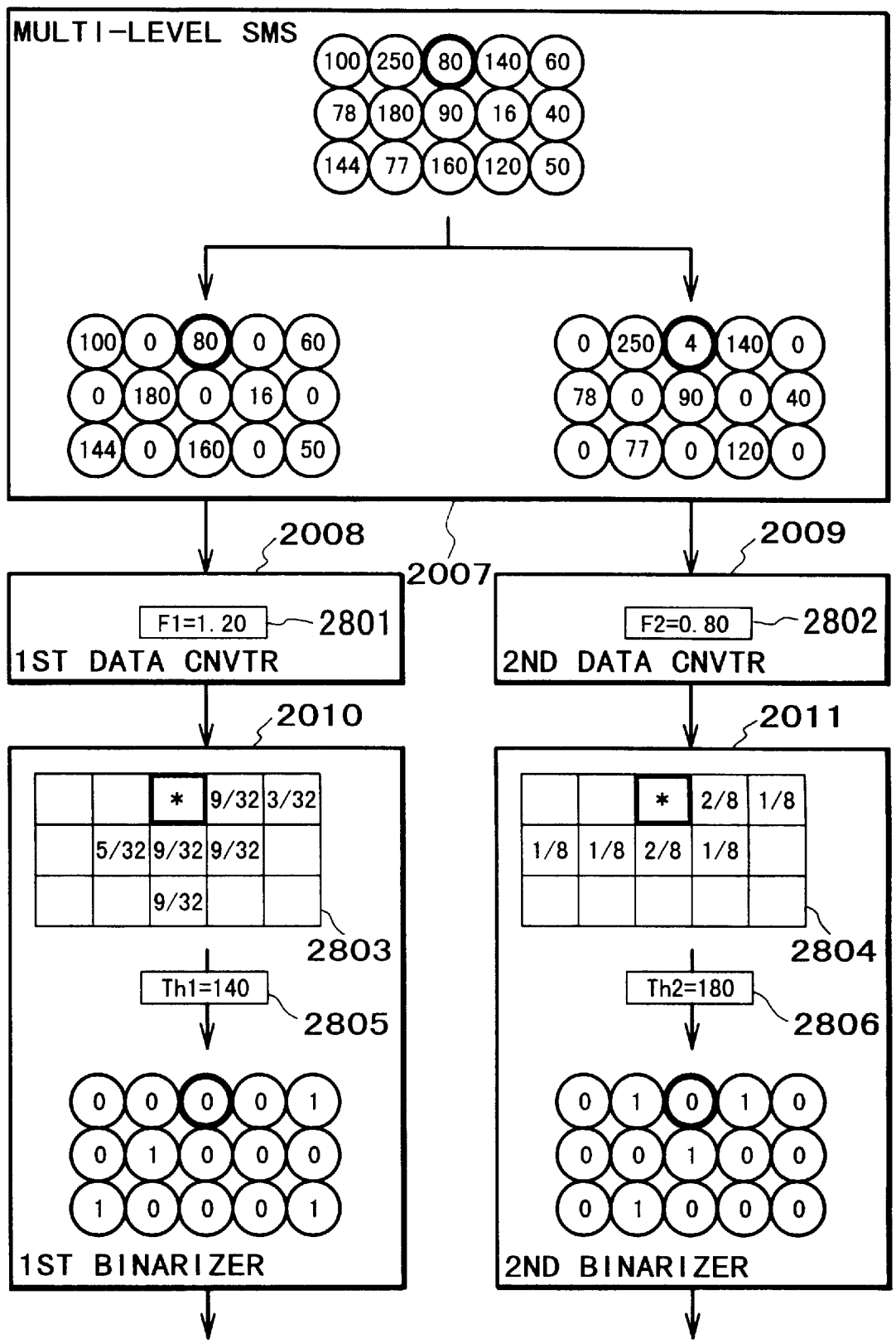
FIG. 40 illustrates specific operations of the multi-level SMS executing portion, the data converter and the binarizing processor according to the twelfth embodiment of the present invention. Invention. Invention.

FIG. 40 shows a specific example of process of the first data converter 2008, the first binarization process portion 2010, the second data converter 2009, the second binarization process portion 2011. Here, the same reference numerals as in FIG. 30 are assigned to the elements having the corresponding functions, and the detailed description thereof has been omitted for simplicity.

In the specific example shown in FIG. 40, for example, the multi-level gradation adjusting value of the noting pixel having a 8 bit structure, 80, for example, is multiplied by data conversion coefficient F1=1.20 by the first data converter 2008 (2801), and is multiplied by data conversion coefficient F2=0.80 for the second head direction by the 2009 (2802). At this time, the sum is not always 2. The processing is carried out in exact synchronism with the speed of the image data transfer, and the data are supplied to the first binarization process portion 2010 and to the second binarization process portion 2011.

In the first binarization process portion 2010, 5/32 or 9/32 of noting pixel value are added to the pixels adjacent the noting pixel indicated by asterisk by the error diffusion matrix A (2803), and in the second binarization process portion 2011, 1/8 or 2/8 of the noting pixel value is added to the neighborhood of the noting pixel by the error diffusion matrix B (2804), so that data are diffused to a plurality of pixels. Thereafter, the binarization is carried out in synchronism with the image transfer speed in the first binarization process portion 2010 using the threshold Th1=140 and in the second binarization process portion 2011 using the threshold Th2=180.

According to the embodiment, the multi-level tone gradation image data to be overlaid by quantitative multi-scan are alternating allocated for each pixel, and the image data after the data distribution importance a correlation. However, since the thresholds of the error diffusion matrixes are different, and the alternating allocation results in remarkable differences, the complementary relation provided by the multi-scan is reduced, and therefore, the quantitative differences can be diffused with the result of reduced half-scan pitch non-uniformity.

In addition, the examples from Embodiment 9 to Embodiment 12 can be properly combined to enhance the effect of reduction of the non-uniformity.

The description will be made as to the steps of textile printing carried out by the recording device having the above-described structures. After the ink jet printing process using the recording apparatus of the ink jet type, the textile is dried (including air drying).

And subsequently, a step of diffusing and fixing therein coloring matter such as a dye in the ink deposited on the fibers of the cloths, using means for fixing such coloring matter contained in the ink. This step can allow sufficient coloring and fastness to be given due to fixation of dye.

The diffusion and fixation step (including a dye diffusion step and a fixing and coloring step) may be any of the conventional well-known methods, including a steaming method (e.g., treated at 100° C. under water vapor atmosphere for ten minutes). In this case, before the textile printing, the cloths may be subjected to alkaline pretreatment.

Thereafter, in the additional step, unreacted dye and substances used in the pretreatment are removed. Finally, the finishing step such as defect correction and ironing is passed through to complete the printing.

In particular, the cloths for ink jet textile printing are required to have the properties of:

(1) being colored with the ink at sufficient densities.

(2) having high dyeing rate of ink (3) rapidly drying the ink on the cloths (4) causing less irregular blurs of ink on the cloths (5) having excellent conveyance capability within the apparatus To meet these requirements, the cloths may be pre-treated as necessary by using, means for adding a treatment agent in this invention. For example, in Japanese Laid-Open Patent Application No. 62-53492, several kinds of cloths having the ink receiving layer have been disclosed, and in Japanese Patent Publication No. 3-46589, the cloths containing a reduction inhibitor or alkaline substances have been proposed. The examples of such pre-treatment may include treating the cloths to contain a substance selected from alkaline substance, water soluble polymer, synthetic polymer, water soluble metallic salt, urea, and thiourea.

Examples of alkaline substance include alkaline metal hydroxide such as sodium hydroxide and potassium hydroxide, amines such as mono-, di-, or tri-ethanolamine, and carbonic acid or alkaline metal bicarbonate such as sodium carbonate, potassium carbonate and sodium bicarbonate. Further, they include organic acid metallic salt such as calcium acetate and barium acetate, ammonia and ammonium compounds. Also, sodium trichloroacetae which becomes alkaline substance under dry heating may be used. Particularly preferable alkaline substance may be sodium carbonate and sodium bicarbonate for use in coloring of reactive dye.

Examples of water soluble polymer include starch substances such as corn and wheat fluor, cellulose substances such as carboxymethyl cellulose, methyl cellulose and hydroxyethyl cellulose, polysaccharides such as sodium alginate, gum arabic, locust bean gum, tragacanth gum, guar gum, and tamarind seeds, protein substances such as gelatine and casein, and natural water soluble substances such as tannin and lignin.

Also, example of synthetic polymer include polyvinyl alcohol compounds, polyethylene oxide compounds, acrylic acid type water soluble polymer, and maleic anhydride type water soluble polymer. Among them, polysaccharide polymer and cellulose polymer are preferable.

Examples of water soluble metallic salt include compounds having a pH of 4 to 10 and making typical ionic crystals such as halides of alkaline metal and alkaline earth metal. Typical examples of such compound include alkaline metals such as NaCl, $Na_2SO_4$, KCl and $CH_3COONa$, and alkaline earth metals such as $CaCl_2$ and $MgCl_2$. Among them, salts of Na, K and Ca are preferable.

The method of pre-treating the cloths to contain any of the above-cited substances is not specifically limited, but may be normally any one of dipping, pad, coating, and spray methods.

Further, since the textile printing ink applied to the cloths for ink jet textile printing may only adhere to the surface of the cloths in the jetted state thereto, the fixation process of fixing a coloring matter in the ink such as a dye onto the fibers is subsequently preferably performed as previously described. Such fixation process may be any one of conventionally well-known methods, including, for example, a steaming method, an HT steaming method, or a thermofix method, and if not using the cloths pretreated with alkali, an alkali pad steam method, an alkali blotch steam method, an alkali shock method, and an alkali cold fix method.

Further, the removal of unreacted dye and substances used in pretreatment can be made by washing the printing medium in the water or hot water having neutral detergent dissolved therein, using means for washing the printing medium, by any of conventionally well-known methods after the fixing process. Note that it is preferable to use any one of conventional well-known fixation processes (for the fixation of falling dye) jointly with the washing.

It should be noted that the printed products subjected to the additional process as above described are then cut away in desired size, cut pieces are subjected to the process for providing the final articles such as stitching, bonding, and welding, to provide the clothes such as a one-piece dress, a dress, a necktie or a swimming suit, a bedclothes cover, a sofa cover, a handkerchief, and a curtain. A number of methods for processing the cloths by stitching or otherwise to provide the clothes or other daily needs have been well-known.

The printing medium may be textile, wall textile, thread for embroidery, wall paper, paper for OHP film, plate-like member such as almite plate, and other various materials usable with the ink jet technique, and the material, weaving method, knitting methods of the textile may be any, and woven fabric and nonwoven material or the like are usable.

The present invention is particularly suitable for use in an ink jet recording head and recording apparatus wherein thermal energy generated by an electrothermal transducer, a laser beam or the like is used to cause a change of state of the ink to eject or discharge the ink. This is because the high density of the picture elements and the high resolution of the recording are possible.

The typical structure and the operational principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejecting portion. This is because the present invention is effective to perform the recording operation with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container. The provisions of the recovery means and/or the auxiliary means for the preliminary operation are preferable, because they can further stabilize the effects of the present invention. Examples of such means include a capping means for the recording head, cleaning means therefore, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applied to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiments, the ink has been liquid. It also may be ink material which is solid below the room temperature but liquid at room temperature. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid State. Another ink material is solidified when it is left, to prevent the evaporation of the ink. In either of the cases, in response to the application of the recording signal producing thermal energy, the ink is liquefied, and the liquefied ink may be ejected. Another ink material may start to be solidified at the time when it reaches the recording material. The present invention is also applicable io such, an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one of the techniques described above is the film boiling system.

The ink jet recording apparatus may be used as an output terminal of an information processing apparatus such as computer or the like, as a copying apparatus combined with an image reader or the like, or as a facsimile machine having information sending and receiving functios.

The present invention can be implemented by supplying a storing medium containing program codes of software executing the steps of the present invention into a system or an apparatus wherein the computer, CPU or MPU of the system or the apparatus reads out and executes the program.

In such a case, the program codes per se constitutes the present invention.

The storing medium for supplying the program codes includes, for example, floppy disk, hard disk, optical disk, magnetoptical disk, CD-ROM, CD-R, magnetic tape, non-volatile memory card and ROM.

Additionally, the present invention can be implemented by an OS (Operating system running in the computer under the control of the program codes to execute a part or entirety of the actual processing.

Further, the present invention can be implemented by writing the program codes in memory of a function-extended board or unit and then executing a part or entity of the actual processing using the CPU provided in the function-extended board or unit.

According to the present invention, the images provided by the respective scans have reduced complementary relation, so that images are formed with incomplete complementary relation, and therefore, even if the registration due to the physical accuracy error slightly changing, the image density does not significantly change since the influence of the change of the registration is lowered.

In the recording operation using the reciprocation main-scanning, the density non-uniformity resulting from the difference in the recording directions can be reduced. By this, the productivity of textile printing on the recording material such as cotton, silk, Nylon, or polyester.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus wherein an image for a predetermined region of a recording material is formed using images having a complementary relation by a plurality of scans of a recording head, said apparatus comprising:
    allocating means for allocating at random a multi-level image data for the predetermined region for the scans;
    image forming means for forming an image having the complementary relation by driving said recording head in said scans on the basis of the image data allocated by said allocating means;
    wherein said allocating means reduces the complementary relation of the image by said forming means.

2. An apparatus according to claim 1, wherein said allocating means wherein said allocating means selects at random a part of all of portions receiving the allocated data and transfers the recording data to them, and selects at random a part or all of them and does not transfer the data to them.

3. An apparatus according to claim 1, wherein said allocating means allocates the image data at random and independently for scans to reduce the complementary relation.

4. An apparatus according to claim 1, wherein said recording head has first and second recording heads disposed deviated in a sub-scanning direction.

5. An apparatus according to claim 1, wherein the predetermined region is recorded by different recording elements.

6. An apparatus according to claim 1, wherein said textile includes cotton, silk, nylon, polyester or mixture thereof.

7. An apparatus according to claim 1, wherein said recording head ejects ink.

8. An apparatus according to claim 7, wherein said recording head ejects the ink using thermal energy.

9. An image forming apparatus wherein an image for a predetermined region of a recording material is formed using images having a complementary relation by a plurality of scans of a recording head, said apparatus comprising:
    scanning means for scanning reciprocal movement of the recording head in a first direction;
    feeding means for feeing the recording material in a second direction which is different from said first direction;
    allocating means for allocating at random a multi-level image data for the predetermined region for the scans;
    control means for effecting recording while controlling allocation of recording data of said allocating means, scanning operation of said scanning means and feeding operation of said feeding means;
    wherein said allocating means selects at random a part of all of portions receiving the allocated data and transfers the recording data to them, and selects at random a part or all of them and does not transfer the data to them.

10. An apparatus according to claim 9, wherein said recording head has first and second recording heads disposed deviated in a sub-scanning direction.

11. An apparatus according to claim 10, further comprising delaying means for delaying transfer of the recording data to one of said first and second recording heads correspondingly to the deviation.

12. An apparatus according to claim 11, wherein each of said first and second recording heads has an array, arranged in the first direction, of recording elements capable of plural color recording, and said allocating means is provided for each of the arrays.

13. An apparatus according to claim 12, wherein said allocating means determines, from a plurality of allocation patters, allocation for each of the array prior to scans of said first and second recording heads.

14. An apparatus according to claim 12, wherein said arrays are provided in separate recording heads.

15. An apparatus according to claim 12, wherein said first and second recording heads effects magenta and cyan recording, and wherein a plurality of arrays of recording elements capable of effecting different density recording are arranged in the first direction, and the plurality of recording arrays form the image of a color.

16. An apparatus according to claim 10, wherein said allocating means changes frequency of random allocation in accordance with a direction of scans of each of said first and second recording heads.

17. An apparatus according to claim 9, wherein said allocating means changes frequency of random allocation in accordance with a direction of scans of said recording head.

18. An apparatus according to claim 9, wherein the recording data is binary.

19. An image forming method wherein an image for a predetermined region of a recording material is formed using images having a complementary relation by a plurality of scans of a recording head, said method comprising the steps of:
    allocating at random a multi-level image data for the predetermined region for the scans;
    forming images having the complementary relation by driving the recording head by the plurality of scans on the basis of the image data allocated by said allocating step;

wherein said allocating step reduces the complementary relation of the images.

20. An image forming apparatus wherein an image for a predetermined region of a recording material is formed using images having a complementary relation by a plurality of scans of a recording head, said apparatus comprising:

allocating means for allocating at random a multi-level image data for the predetermined region for the scans;

gradation reducing means for reducing gradation of the multi-level image data allocated by said allocating means, respectively;

image forming means for forming an image by driving said recording head in said scans on the basis of the image data processed by said gradation reducing means wherein said allocating means reduces the complementary relation of the image by said forming means.

21. An apparatus according to claim 20, wherein said allocating means allocates at random the multi-level image data.

22. An apparatus according to claim 20, wherein said allocating means allocates the multi-level image data with attenuation.

23. An apparatus according to claim 20, wherein said allocating means converts the multi-level image data for scans with different coefficients.

* * * * *

UNITED STATES PATENT AND TRADEMARK OFFICE
CERTIFICATE OF CORRECTION

PATENT NO.   : 6,511,146 B2
DATED        : January 28, 2003
INVENTOR(S)  : Yoshikazu Ishikawa et al.

It is certified that error appears in the above-identified patent and that said Letters Patent is hereby corrected as shown below:

Drawings,
Sheet 18, FIG. 21, "CONVESION" should read -- CONVERSION --.

Column 1,
Line 48, "head" should read -- head. --; and
Line 49, "ink s" should read -- inks --.

Column 2,
Line 20, "coverts" should read -- converts --.

Figure 9:
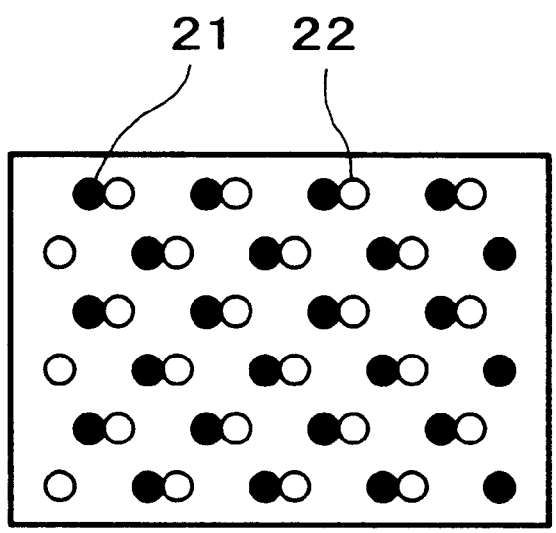
FIG. 9 illustrates positions of dots when the overlaying printing ease effected by actual conventional front head and rear head.

Column 3,
Line 50, "remaining" should read -- remaining. --;
Line 62, "A" should read -- a --; and
Line 64, "FIG 9," (2nd occurrence) should be deleted.

Column 4,
Line 14, "are" should read -- an --.

Column 5,
Line 14, "Invention" should be deleted; and
Line 45, "Invention" should be deleted.

Column 6,
Line 29, ""Invention. Invention." should be deleted.

Column 8,
Line 1, "printing the After" should read -- printing. After --;
Line 2, "using" should read -- uses --; and
Line 33, "1001" should read -- 1001. --.

Column 9,
Line 2, "-8-+8.-8-+8." should read -- -8-+8.--;
Line 10, "printing." should read -- printing. ¶ (Embodiment 2) --;
Line 48, "Dot. When" should read -- When --; and
Line 49, "in" (second occurrence) should read -- In --.

Column 10,
Line 6, "ticket" should read -- ticket. --; and
Line 51, "1 3" should read -- 1-3 --.

UNITED STATES PATENT AND TRADEMARK OFFICE
CERTIFICATE OF CORRECTION

PATENT NO.    : 6,511,146 B2
DATED         : January 28, 2003
INVENTOR(S)   : Yoshikazu Ishikawa et al.

It is certified that error appears in the above-identified patent and that said Letters Patent is hereby corrected as shown below:

Column 11,
Line 67, "the The" should read -- the --.

Column 12,
Line 20, "in" should read -- is --;
Line 22, "is" should read -- are --;
Line 26, "with." should read -- width. --; and
Line 27, "with." should read -- width.--.

Column 13,
Line 35, "type" should read -- type, --.

Column 14,
Line 13, ""Respectively." should be deleted;
Line 17, "506" should read -- 506. --;
Line 37, "503" should read -- 503, --; and
Line 49, "there" should read -- There --.

Column 15,
Line 12, "supplied" should read -- supplying --;
Line 40, "1.5times" should read -- 1.5 times --.

Column 16,
Line 4, "print" should read -- print. --;
Line 45, "they" should read -- the --.

Column 17,
Line 7, ""CPU2002" (first occurrence) should read -- CPU2002. --;
Line 9, "basic-ejection" should read -- basic ejection --; and
Line 57, "2009." should read -- 2009 --.

Column 18,
Line 5, "second "504" should read -- 505 --; and
Line 7, "different" should read -- Different --.

Column 19,
Line 40, "are" should read -- a --; and
Line 42, "2011. 2011." should read -- 2011. --.

UNITED STATES PATENT AND TRADEMARK OFFICE
CERTIFICATE OF CORRECTION

PATENT NO.    : 6,511,146 B2
DATED         : January 28, 2003
INVENTOR(S)   : Yoshikazu Ishikawa et al.

It is certified that error appears in the above-identified patent and that said Letters Patent is hereby corrected as shown below:

Column 24,
Line 54, ""io" should read -- to --; and
Line 67, "functios." should read -- functions. --.

Column 25;
Line 12, "system" should read -- system) --; and
Line 52, "allocating means wherein said" should be deleted.

Column 26,
Line 10, "feeing" should read -- feeding --;
Line 42, "effects" should read -- effect --;
Line 54, "the" should read -- said recording head ejects the ink using thermal energy. --; and
Line 55, "recording data is binary." should be deleted.

Column 27,
Line 14, "means" should read -- means," --.

Signed and Sealed this

Eighteenth Day of November, 2003

JAMES E. ROGAN
*Director of the United States Patent and Trademark Office*